(12) United States Patent
Shin

(10) Patent No.: US 11,360,564 B1
(45) Date of Patent: Jun. 14, 2022

(54) TUNABLE FLEXIBLE HAPTIC ACTUATORS AND RELATED DEVICES, SYSTEMS, AND METHODS

(71) Applicant: Facebook Technologies, LLC, Menlo Park, CA (US)

(72) Inventor: Dongsuk Shin, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/319,360

(22) Filed: May 13, 2021

(51) Int. Cl.
*G06F 3/01* (2006.01)

(52) U.S. Cl.
CPC .............. *G06F 3/016* (2013.01); *G06F 3/014* (2013.01)

(58) Field of Classification Search
None
See application file for complete search history.

(56) References Cited

U.S. PATENT DOCUMENTS

| 9,368,709 B2 | 6/2016 | Brokken et al. |
| 2017/0131769 A1* | 5/2017 | Keller ..................... G06F 3/014 |
| 2018/0061191 A1* | 3/2018 | Alghooneh .............. G08B 6/00 |

\* cited by examiner

*Primary Examiner* — Carl Adams
(74) *Attorney, Agent, or Firm* — FisherBroyles, LLP

(57) ABSTRACT

The disclosed wearable devices may include a body shaped and sized to be worn against a user's skin, a flexible vibrotactile actuator positioned on or in the body, and a tunable stiffness material adjacent to the flexible haptic actuator. The flexible vibrotactile actuator may be in a location to transmit a haptic sensation to the user's skin when the body is worn by the user. The tunable stiffness material may have an adjustable stiffness such that adjustment of the stiffness of the tunable stiffness material alters a haptic sensation induced by the flexible haptic actuator against the user's skin. Various other related methods, systems, and devices are also disclosed.

19 Claims, 15 Drawing Sheets

TUNABLE FLEXIBLE HAPTIC ACTUATORS AND RELATED DEVICES, SYSTEMS, AND METHODS

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
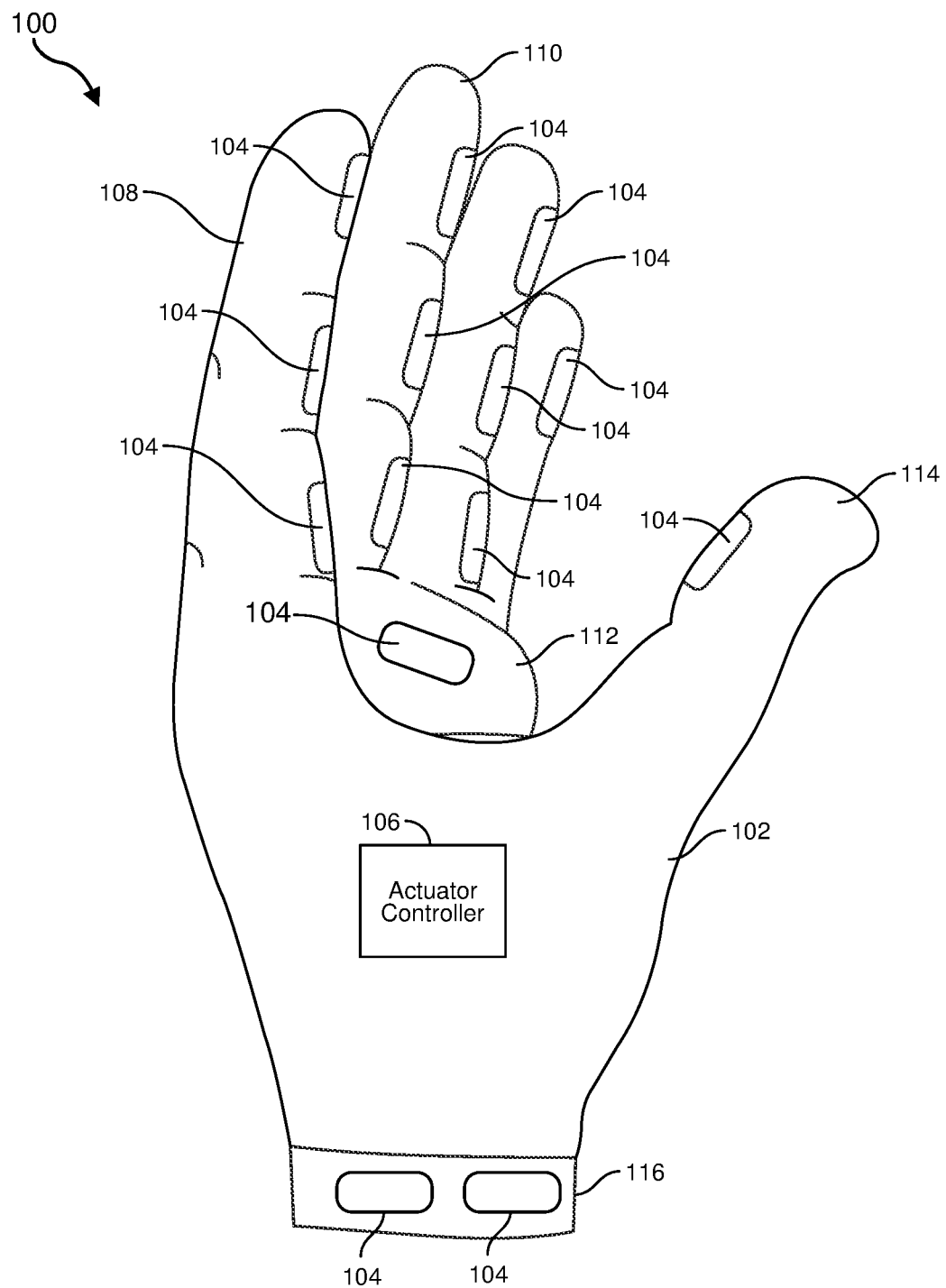
FIG. 1 is a perspective view of a wearable device in the form of a glove, according to at least one embodiment of the present disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

Vibrotactile devices include devices that may vibrate to provide haptic feedback to a user of a device. For example, some modern mobile devices (e.g., cell phones, tablets, mobile gaming devices, gaming controllers, etc.) include a vibrotactile device that informs the user through a vibration that an action has been taken. The vibration may indicate to the user that a selection has been made or a touch event has been sensed. Vibration may also deliver physical information to the user, such as conveying physical object properties like hardness or texture, indicating location of an object, etc. Abstract information, such as communication, navigation, quantities, speed, etc., may also be delivered to the user by various vibrational signals. Vibrotactile devices may also be used to provide an alert or signal to the user.

Various types of vibrotactile devices exist, such as piezoelectric devices, eccentric rotating mass devices, and linear resonant actuators. Such conventional vibrotactile devices may include one or more elements that vibrate upon application of an electrical voltage. In the case of piezoelectric devices, an applied voltage may induce bending or other displacement in a piezoelectric material. Eccentric rotating mass devices induce vibration by rotating an off-center mass around an axle of an electromagnetic motor. Linear resonant actuators may include a mass on an end of a spring that is driven by a linear actuator to cause vibration. Many of these conventional vibrotactile devices are rigid and inflexible. Moreover, conventional vibrotactile devices typically induce a certain, constant sensation to the user upon application of a consistent voltage thereto.

The present disclosure is generally directed to wearable devices and artificial-reality systems with flexible haptic actuators and a tunable stiffness material adjacent to the flexible haptic actuators for adjusting an operating characteristic of the flexible haptic actuators. Related methods are also disclosed. As will be explained in greater detail below, embodiments of the present disclosure may include wearable devices that include a body, a flexible vibrotactile actuator, and a tunable stiffness material. The body of the wearable devices may be shaped and sized to be worn against a user's skin. The flexible vibrotactile actuator may be positioned on or in the body in a location to transmit a haptic sensation to the user's skin when the body is worn by the user. The tunable stiffness material may be adjacent to the flexible haptic actuator and may have an adjustable stiffness such that adjustment of the stiffness of the tunable stiffness material alters a haptic sensation induced by the flexible haptic actuator against the user's skin. Such wearable devices may be capable of generating a variety of haptic signals, which may be tailored for a certain desired sensation and/or for use on a particular body part (e.g., how hard or soft the body part is) against which the flexible haptic actuator is positioned.

Features from any of the embodiments described herein may be used in combination with one another in accordance with the general principles described herein. These and other embodiments, features, and advantages will be more fully understood upon reading the following detailed description in conjunction with the accompanying drawings and claims.

Figure 2:
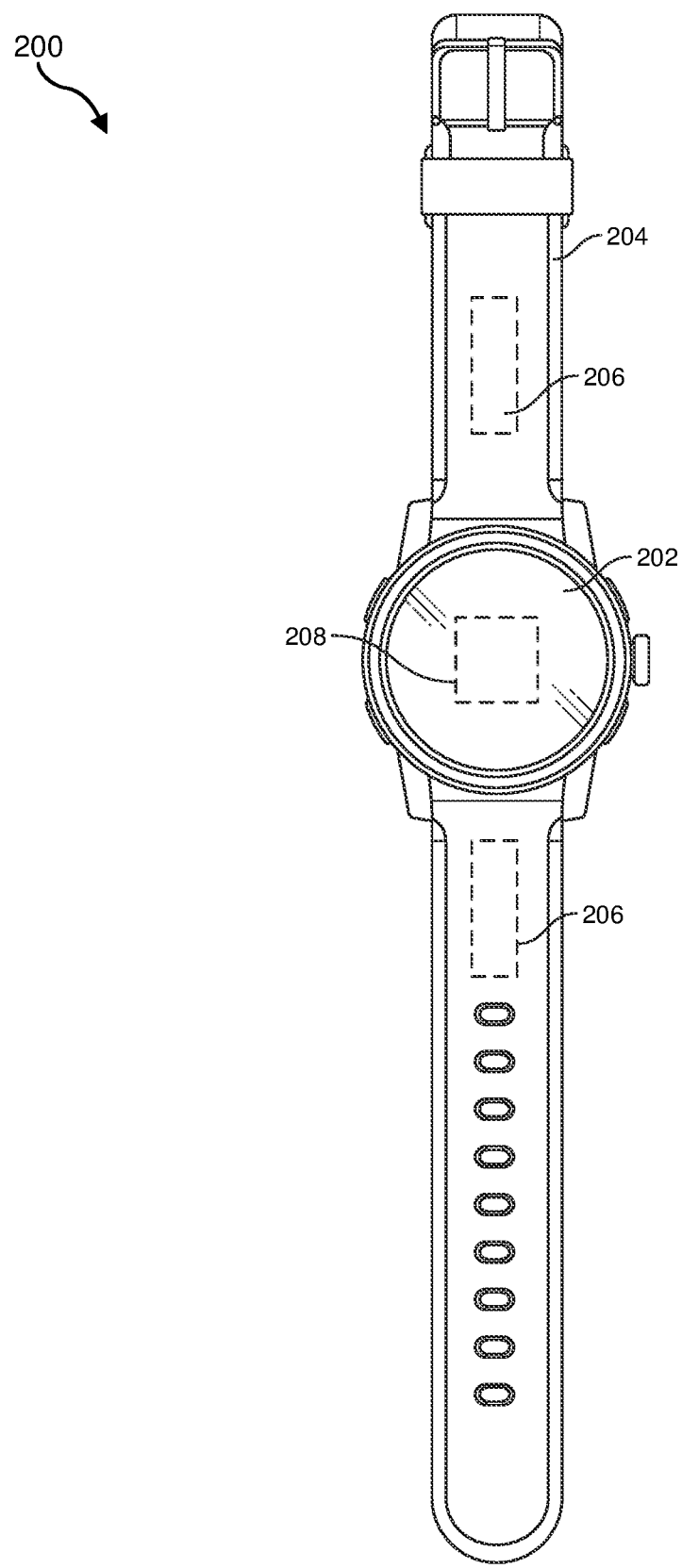
FIG. 2 is a perspective view of a wearable device in the form of a wristwatch, according to at least one embodiment of the present disclosure.
Figure 3:
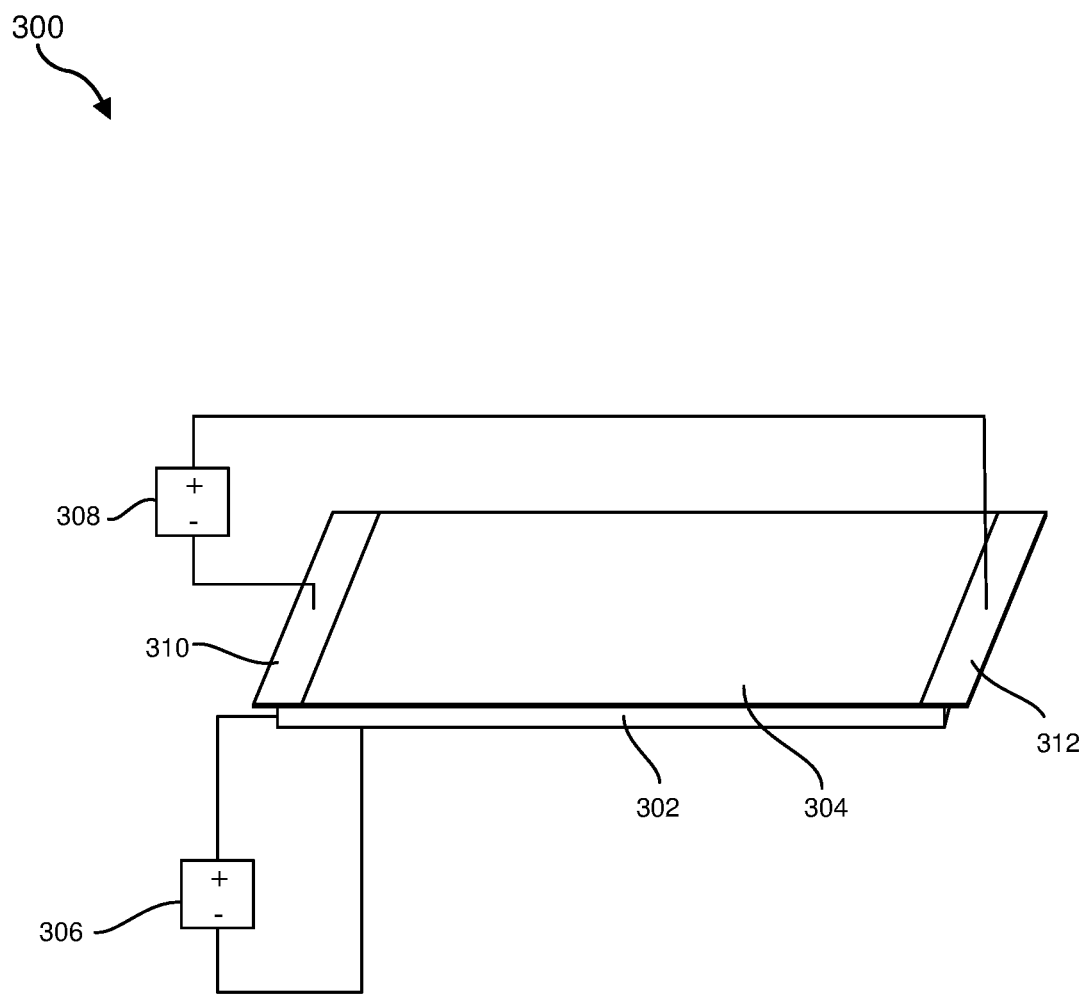
FIG. 3 is a perspective view of a haptic actuator with a tunable stiffness material, according to at least one embodiment of the present disclosure.
Figure 9:
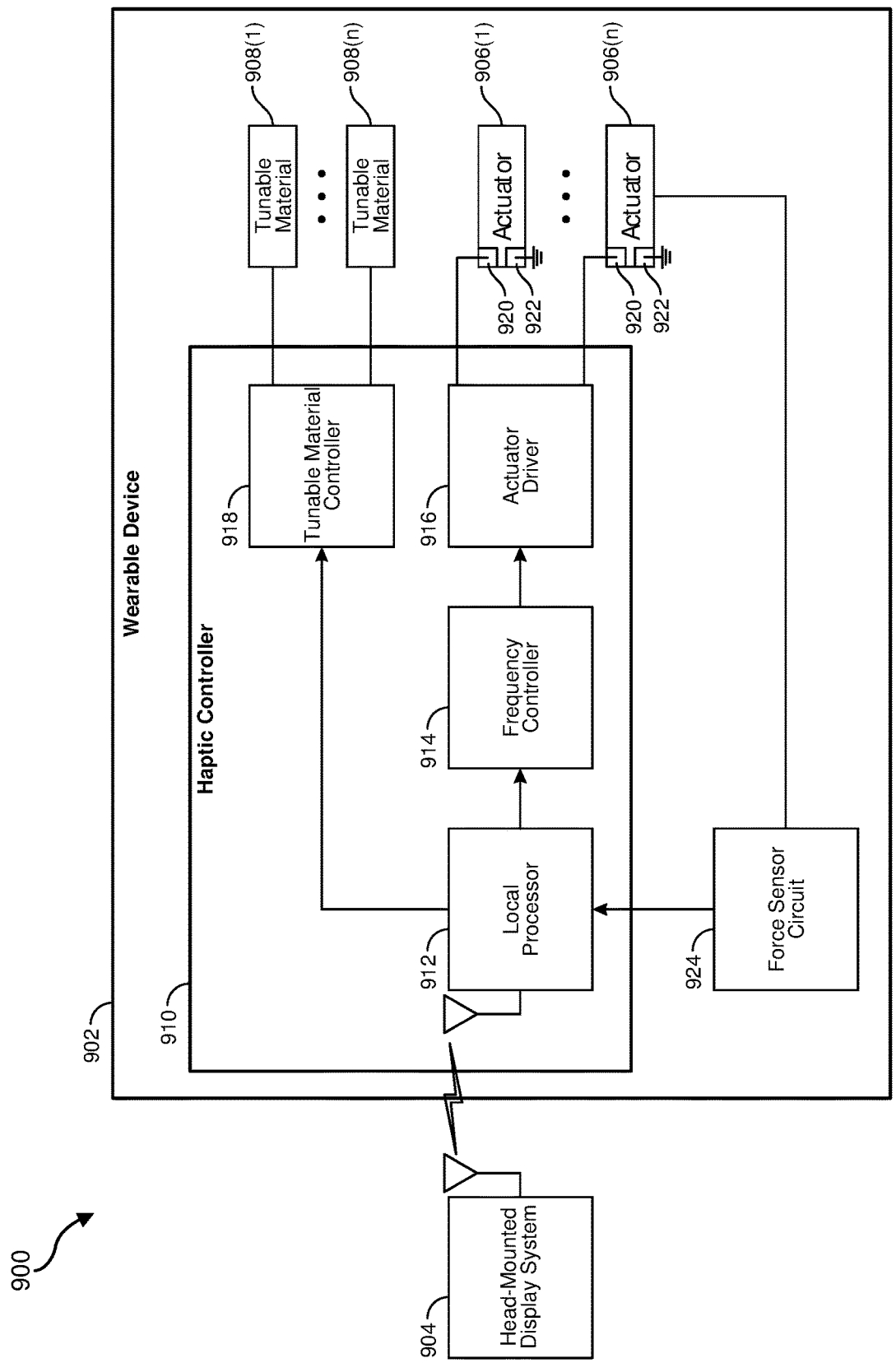
FIG. 9 is a block diagram of an artificial-reality system, according to at least one embodiment of the present disclosure.
Figure 10:
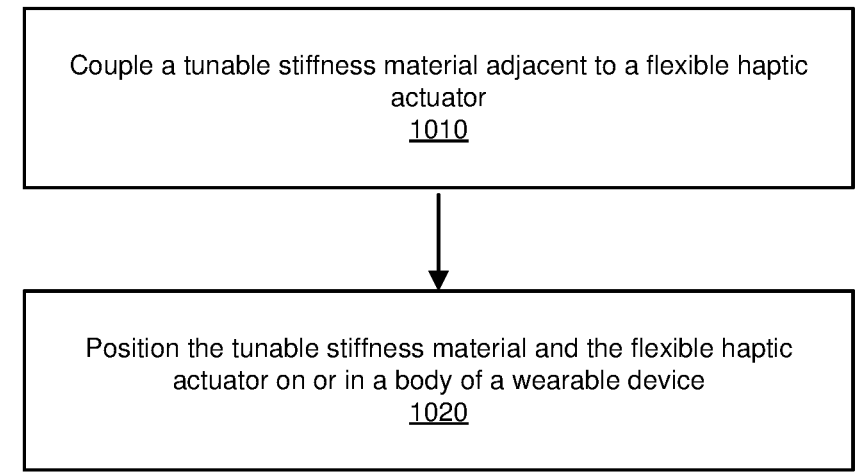
FIG. 10 is a flow diagram of a method of forming a wearable device, according to at least one embodiment of the present disclosure.

The following will provide, with reference to FIGS. 1 and 2, detailed descriptions of example wearable devices incorporating flexible haptic actuators and tunable stiffness materials. With reference to FIG. 3, an example flexible haptic actuator and tunable stiffness material will be described. Detailed descriptions of a shifting resonant frequency, as a result of altering a stiffness of a tunable stiffness material, will be provided with reference to FIG. 4. With reference to FIGS. 5-8, the following will provide detailed descriptions of additional examples of haptic actuators. With reference to FIG. 9, an artificial-reality system including a wearable device and a head-mounted display system will be described. With reference to FIG. 10, an example method of forming a wearable device will be described. With reference to FIGS. 11-15, the following will provide detailed descriptions of various artificial-reality devices and systems that may be used in conjunction with embodiments of the present disclosure.

FIG. 1 is a perspective view of a wearable device 100 in the form of a glove, according to at least one embodiment of the present disclosure. The wearable device 100 may include a body 102 that physically supports one or more haptic actuators 104. Operation of the haptic actuators 104 may be controlled by an actuator controller 106, which may also be supported by the body 102 or may be supported by a separate wearable device (e.g., an armband, a vest, a head-mounted display, etc.). The actuator controller 106 may be configured to actuate the haptic actuators 104 based on input from a separate device, such as a head-mounted display system, a gaming system, or another system configured to present visual and/or audible content to the user. In some cases, actuation of the haptic actuators 104 may correspond to the visual and/or audible content displayed to the user.

The haptic actuators 104 may be positioned on the body 102 of the wearable device 100 in a location to transmit a haptic sensation to a user's skin when the body 102 is worn by the user. In some examples, the haptic actuators 104 may be positioned on or adjacent to an interior (e.g., skin-facing surface) of the wearable device 100. The haptic sensation may be transmitted directly by the haptic actuators 104 abutting against the user's skin. In additional examples, a textile (e.g., clothing, fabric, leather, polymer sheet, etc.) or other material may be disposed between the haptic actuators 104 and the user's skin. In the example shown in FIG. 1, the haptic actuators 104 may be positioned at a variety of locations on the body 102 of the wearable device 100, such as along one or more of the glove fingers 108 (e.g., at a fingertip portion 110 of the glove fingers 108 and/or at an intermediate portion of the glove fingers 108), in a palm region 112, in a thumb portion 114, on a cuff 116, etc.

As explained in further detail below, each of the haptic actuators 104 may include a flexible haptic vibrotactile actuator positioned adjacent to (e.g., coupled to, bonded to, adhered to, secured to, embedded with, etc.) a tunable stiffness material. The actuator controller 106 may be operatively coupled to the haptic actuators 104 to control the operation (e.g., vibration) of the flexible haptic vibrotactile actuator and to adjust a stiffness of the tunable stiffness material. The flexible haptic vibrotactile actuator may be coupled to the tunable stiffness material such that altering the stiffness of the tunable stiffness material may result in a change in an operating characteristic of the flexible haptic vibrotactile actuator. For example, adjusting the stiffness of the tunable stiffness material may change a resonant frequency and/or vibration amplitude of the flexible haptic vibrotactile actuator, such as to induce a different or improved haptic sensation to the user and/or to tune the vibration of the flexible haptic vibrotactile actuator to a user's body part that is adjacent to a particular haptic actuator 104.

The wearable device 100 incorporating such haptic actuators 104 may have a form factor other than the glove illustrated in FIG. 1, such as a wristwatch (e.g., a watch band and/or a watch body of a wristwatch), wristband, armband, headband, leg band, etc. For example, FIG. 2 is a perspective view of a wearable device 200 in the form of a wristwatch, according to at least one embodiment of the present disclosure.

The wearable device 200 may include a watch body 202 coupled to a watch band 204. The watch body 202 and the watch band 204 may have a size and/or shape that is configured to allow a user to wear the wearable device 200 on a body part (e.g., a wrist). The watch body 202 and/or the watch band 204 may support one or more haptic actuators 206. Operation of the haptic actuators 206 may be controlled by an actuator controller 208, which may be supported by the watch body 202 (as shown in FIG. 2) or by the watch band 204.

The haptic actuators 206 of the wearable device 200 may each include a vibrotactile actuator (e.g., a flexible vibrotactile actuator) coupled to a tunable stiffness material. The tunable stiffness material may be used to adjust a stiffness, and therefore an operating characteristic (e.g., resonant frequency, vibration amplitude, mechanical impedance of the assembly, etc.), of the haptic actuator 206. For example, for one of the haptic actuators 206 that is positioned on the watch band 204 in a location to be adjacent to a bony (e.g., harder) part of the wrist when the wearable device 200 is worn by a user, the stiffness of the tunable stiffness material may be adjusted such that the haptic actuator 206 has a relatively lower resonant frequency. Conversely, for one of the haptic actuators 206 that is positioned on the watch band 204 in a location to be adjacent to a fleshy (e.g., softer) part of the wrist when the wearable device 200 is worn by a user, the stiffness of the tunable stiffness material may be adjusted such that the haptic actuator 206 has a relatively higher resonant frequency. In additional examples, the resonant frequency of the haptic actuator 206 may be adjusted by changing the stiffness of the tunable stiffness material to induce a different (e.g., stronger, weaker, etc.) haptic sensation to the user's skin.

FIG. 3 is a perspective view of a haptic actuator 300 that includes a tunable stiffness material 302 coupled to a vibrotactile actuator 304, according to at least one embodiment of the present disclosure. The haptic actuator 300 may be used in a wearable device, such as the wearable devices 100, 200 shown in FIGS. 1 and 2 and discussed above.

The tunable stiffness material 302 may be coupled to the vibrotactile actuator 304 in a variety of ways. For example, an adhesive and/or one or more fasteners (e.g., rivets, screws, pins, etc.) or external structures (clamping around edges) may secure the tunable stiffness material 302 to the vibrotactile actuator 304. In some embodiments, the tunable stiffness material 302 may be formed (e.g., deposited, chemically grown, etc.) directly on a surface of the vibrotactile actuator 304 and/or on a surface of an electrode of the vibrotactile actuator 304.

A tunable stiffness driver circuit 306 (e.g., a voltage source), illustrated schematically in FIG. 3, may be operably coupled to the tunable stiffness material 302 to drive alterations in a stiffness of the tunable stiffness material 302. The tunable stiffness driver circuit 306 may be electrically coupled to the tunable stiffness material 302, such as via conductive wires or traces.

An actuator driver circuit 308 (e.g., another voltage source), illustrated schematically in FIG. 3, may be operably coupled to the vibrotactile actuator 304 to drive vibration of the vibrotactile actuator 304 by application of a voltage thereto. The actuator driver circuit 308 may be electrically coupled to a first electrode 310 and a second electrode 312 of the vibrotactile actuator 304, such as via conductive wires or traces. In some embodiments, the tunable stiffness driver circuit 306 may similarly be electrically coupled to the tunable stiffness material 302 via electrodes.

The first electrode 310 and second electrode 312 of the vibrotactile actuator 304 are illustrated in FIG. 3 as being positioned at opposing longitudinal ends of the vibrotactile actuator 304. However, the present disclosure is not so limited and the first and second electrodes 310, 312 may be located at other portions of the vibrotactile actuator 304. For example, the first and second electrodes 310, 312 may be located on opposing major (e.g., flat) surfaces of the vibrotactile actuator 304, or adjacent to each other at one end of the vibrotactile actuator 304.

The tunable stiffness material 302 may be any material that exhibits a controllable variable stiffness. For example, the stiffness of the tunable stiffness material 302 may be altered by application of one or more of an electrical field, a magnetic field, and/or heat (or removal of heat). Example materials that may be suitable for use as the tunable stiffness material 302 include a shape memory alloy material, an electroplastic elastomer hydrogel material, a conductive elastomer material, and/or a temperature-sensitive polymer material. In some embodiments, the tunable stiffness material 302 may be selected to exhibit a range of stiffnesses that are similar in magnitude to a stiffness of the vibrotactile actuator 304. Thus, the haptic actuator 300 may exhibit perceptible changes in operation when the stiffness of the tunable stiffness material 302 is adjusted.

Shape memory alloy materials may change in stiffness based on a temperature change, which may be induced by application of heat and/or by application of electricity (e.g., through a resistive element and/or through the shape memory alloy material itself). Some example shape memory alloy materials include nickel-titanium (also commonly referred to as "nitinol"), copper-aluminum-nickel, iron-manganese-silicon, copper-zinc-aluminum, copper-aluminum-nickel, etc. Electroplastic elastomer hydrogel materials may be cross-linked materials that can absorb and store water to swell and that can release the water to shrink. The swelling and shrinking may be induced by application of a voltage. Conductive elastomer materials may include an elastomer with conductive particles (e.g., carbon, silica, etc.) distributed throughout the elastomer. Conductive elastomer materials may change in stiffness upon application or removal of a voltage. Temperature-sensitive polymer materials may be a type of hydrogel or other polymer material that swells and/or shrinks (and therefore changes in stiffness) depending on a temperature of the material.

The vibrotactile actuator 304 may include a variety of materials. In some examples, the vibrotactile actuator 304 may be a flexible vibrotactile actuator formed of a flexible material. The flexible material of the vibrotactile actuator 304 may be conformable to the user's body part, such as by wrapping at least partially around the user's wrist or finger. Example materials that may be used for the vibrotactile actuator 304 include dielectric electroactive polymer materials, ferroelectric polymer materials, electrostrictive graft polymer materials, liquid crystalline polymer materials, ionic electroactive polymer materials, electrorheological fluid materials, ionic polymer-metal composite materials, and/or hydrogel materials. For example, the vibrotactor actuator 304 may include a polyvinylidene fluoride (PVDF) actuator, an electret-based actuator, a dielectric elastomer actuator, an electrostatic zipper actuator, a fluidic actuator, a shape memory alloy (SMA) actuator, etc.

The vibrotactile actuator 304 may be configured to vibrate upon application of a sufficient voltage (e.g., alternating current voltage) by the actuator driver circuit 308. The frequency (e.g., speed) at which the vibrotactile actuator 304 vibrates may be controlled by the frequency of the applied voltage. The amplitude (e.g., strength) of the vibrations of the vibrotactile actuator 304 may depend at least in part on whether the induced vibration frequency is at or near a resonant frequency of the vibrotactile actuator 304. The resonant frequency may depend upon a number of factors, such as a geometry of the haptic actuator 300 (e.g., including the geometry of the tunable stiffness material 302 and/or of the vibrotactile actuator 304), a type (e.g., material) of the vibrotactile actuator 304, a temperature of the haptic actuator 300, etc. Geometry factors that may affect the resonant frequency may include thickness, shape, width, length, location and number of constrained connection points, etc.

In operation, the haptic actuator 300 may have a first resonant frequency when the tunable stiffness material 302 is at a first, lower stiffness. Driving the vibrotactile actuator 304 with the actuator driver circuit 308 at the first resonant frequency may cause the user to experience a first haptic sensation. The tunable stiffness material 302 may be stiffened to exhibit a second, higher stiffness, such as by activating the tunable stiffness driver circuit 306. When the tunable stiffness material 302 is at the second stiffness, the haptic actuator 300 may have a second resonant frequency that is different from the first resonant frequency. Driving the vibrotactile actuator 304 to vibrate at the second resonant frequency may cause the user to experience a second haptic sensation that is different from the first haptic sensation. The concept of shifting resonant frequencies is illustrated in FIG. 4 and explained further below.

For example, altering the stiffness of the tunable stiffness material 302 coupled to the vibrotactile actuator 304 may increase the intensity of the vibrotactile sensation, decrease the intensity of the vibrotactile sensation, increase the perceived frequency of the vibrotactile sensation, decrease the perceived frequency of the vibrotactile sensation, or a combination thereof.

Figure 4:
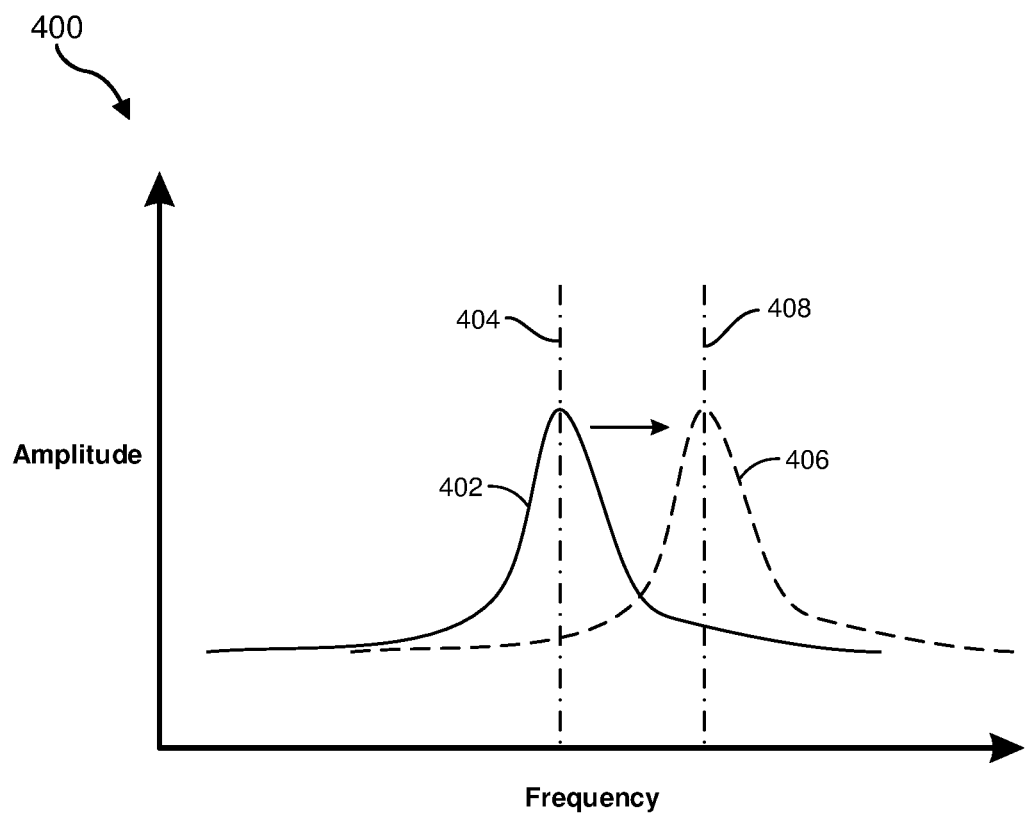
FIG. 4 is a plot of amplitude and frequency for a haptic actuator and illustrates a shift in a resonant frequency thereof, according to at least one embodiment of the present disclosure.

FIG. 4 is a plot 400 of amplitude and frequency for a haptic actuator and illustrates a shift in a resonant frequency thereof, according to at least one embodiment of the present disclosure. A first line 402 represents an example first vibrational response of a haptic actuator when a tunable stiffness material thereof is operated to exhibit a first stiffness. In this first operational state, the haptic actuator may have a first resonant frequency 404, which may be a vibrational frequency at which an amplitude of the vibration is at its highest. A second line 406 (shown in the plot 400 as a dashed line) represents an example second vibrational response of the haptic actuator when the tunable stiffness material thereof is operated to exhibit a second, different stiffness (e.g., a higher stiffness). In this second operational state, the haptic actuator may have a second resonant frequency 408 that is different from (e.g., higher than) the first resonant frequency 404. Thus, a resonant frequency and an amplitude response of the haptic actuator at various frequencies may shift as a result of altering a stiffness of the tunable stiffness material thereof.

This alteration of the resonant frequency may be caused as desired by controlling the stiffness of the tunable stiffness material. For example, the resonant frequency may be purposefully changed to cause the user to experience different (e.g., stronger, weaker, faster, slower, etc.) haptic sensations that may correspond to different visual content displayed to the user, such as in an artificial-reality system (e.g., a head-mounted display system). Many potential scenarios in an artificial-reality environment may benefit from such changes in haptic sensations, such as to improve an immersiveness of a user experience.

In one example, a user may view a scene in an artificial-reality environment on a head-mounted display (e.g., augmented-reality glasses, virtual-reality headset, etc.). The scene may include multiple virtual objects that are displayed to appear in front of the user. The virtual objects may include a first virtual object that is meant to be perceived as soft and a second virtual object that is meant to be perceived as hard. The user may wear a glove incorporating a flexible vibrotactile actuator coupled to a tunable stiffness material (e.g., the wearable device 100 of FIG. 1). When the user reaches out to touch a space where the first, soft virtual object is visually perceived, the tunable stiffness material may be operated at a high stiffness to result in vibrations at a high resonant frequency. A haptic sensation of smoothness may be perceived by the user due to the vibrations at the high resonant frequency. When the user reaches out to touch a space where the second, hard virtual object is visually perceived, the tunable stiffness material may be operated at a low stiffness to result in vibrations at a low resonant frequency. A haptic sensation of roughness may be perceived by the user due to the vibrations at the low resonant frequency.

Additional features of or changes to haptic actuators may also alter their resonant frequencies, such as those described below with reference to FIGS. 5 and 6.

Figure 5:
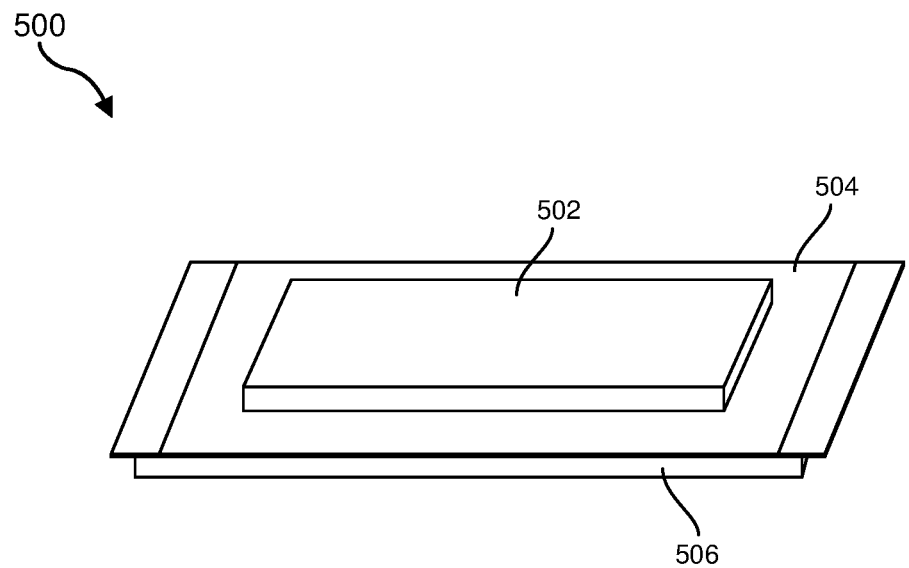
FIG. 5 is a perspective view of a haptic actuator with a mass coupled to the haptic actuator, according to at least one embodiment of the present disclosure.

FIG. 5 is a perspective view of a haptic actuator 500 with a mass 502 coupled to a vibrotactile actuator 504 (e.g., a flexible haptic vibrotactile actuator 504), according to at least one embodiment of the present disclosure. In some respects, the haptic actuator 500 of FIG. 5 may be similar to the haptic actuator 300 described above with reference to FIG. 3. For example, a tunable stiffness material 506 may be coupled to the vibrotactile actuator 504. The tunable stiffness material 506 may be configured to exhibit a controllable variable stiffness, the altering of which may change a resonant frequency of the haptic actuator 500. Although not shown in FIG. 5, the haptic actuator 500 may also include an actuator driver circuit for causing the vibrotactile actuator 504 to vibrate and a tunable stiffness driver circuit for altering the stiffness of the tunable stiffness material 506.

As illustrated in FIG. 5, the mass 502 may be positioned on or over a major (e.g., flat) surface of the vibrotactile actuator 504. The mass 502 may be coupled to the vibrotactile actuator 504, such as with an adhesive, with thread (e.g., by being sewn), with one or more fasteners (e.g., screws, rivets, pins, etc.), or any combination thereof. The mass 502 may be configured to alter a resonant frequency of the haptic actuator 500. For example, by increasing the mass 502, the resonant frequency of the haptic actuator 500 may decrease. Conversely, by decreasing the mass 502, the resonant frequency of the haptic actuator 500 may increase. The geometry of the mass 502 may also be varied to change the resonant frequency of the haptic actuator 500, such as by changing a shape, thickness, width, depth, length, etc. of the mass 502. These physical characteristics of the mass 502 may be selected at the time the haptic actuator 500 is manufactured to set a baseline resonant frequency of the haptic actuator 500. Additional changes to the resonant frequency during operation may be made by changing the stiffness of the tunable stiffness material 506, as explained above.

The mass 502 may be formed of any material, depending on the desired operational characteristics of the haptic actuator 500. For example, the mass 502 may be or include a polymer material, a metal material, a fabric material, a glass material, a composite material, a fluid-filled container, etc. In some examples, the mass 502 may be formed of a flexible material (e.g., an elastomer, a flexible polymer material, a fabric, etc.) to conform to the user's body part (e.g., wrist, finger, etc.) along with the vibrotactile actuator 504. In additional examples, the mass 502 may be formed of a rigid material (e.g., a rigid polymer material, a metal material, a glass material, etc.)

Figure 6:
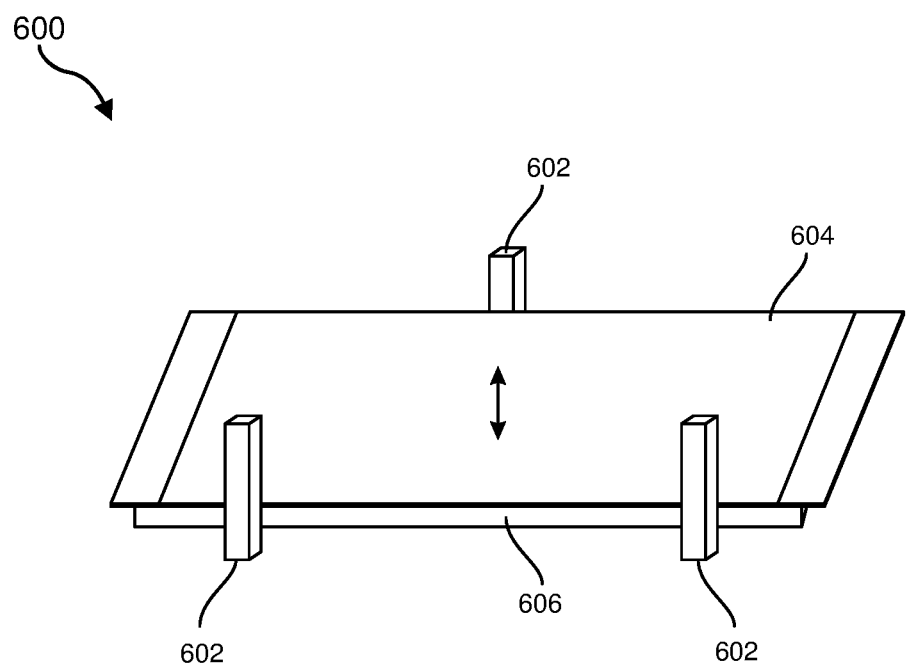
FIG. 6 is a perspective view of a haptic actuator with a guide structure, according to at least one embodiment of the present disclosure.

FIG. 6 is a perspective view of a haptic actuator 600 with a guide structure 602, according to at least one embodiment of the present disclosure. In some respects, the haptic actuator 600 of FIG. 6 may be similar to the haptic actuator 300 described with reference to FIG. 3. For example, the haptic actuator 600 may include a vibrotactile actuator 604 (e.g., a flexible haptic vibrotactile actuator 604) and a tunable stiffness material 606 coupled to the vibrotactile actuator. Although not shown in FIG. 6, the haptic actuator 600 may also include an actuator driver circuit for causing the vibrotactile actuator 604 to vibrate and a tunable stiffness driver circuit for altering the stiffness of the tunable stiffness material 606.

As shown in FIG. 6, the guide structure 602 may include one or more guiderails, slots, posts, or other structures for constraining vibration of the vibrotactile actuator 604 to a desired direction (e.g., in an up-and-down direction from the perspective of FIG. 6). The guide structure 602 may improve an efficiency of the haptic actuator 600 by directing mechanical energy of the vibrotactile actuator 604 in a desired direction, such as towards a user's skin. The guide structure 602 may reduce an amount of vibration or other movement that might otherwise occur in a different direction, such as parallel to the user's skin. Thus, for a given input energy, a haptic sensation of the haptic actuator 600 may be improved (e.g., increased) by the presence and configuration of the guide structure 602.

Figure 7:
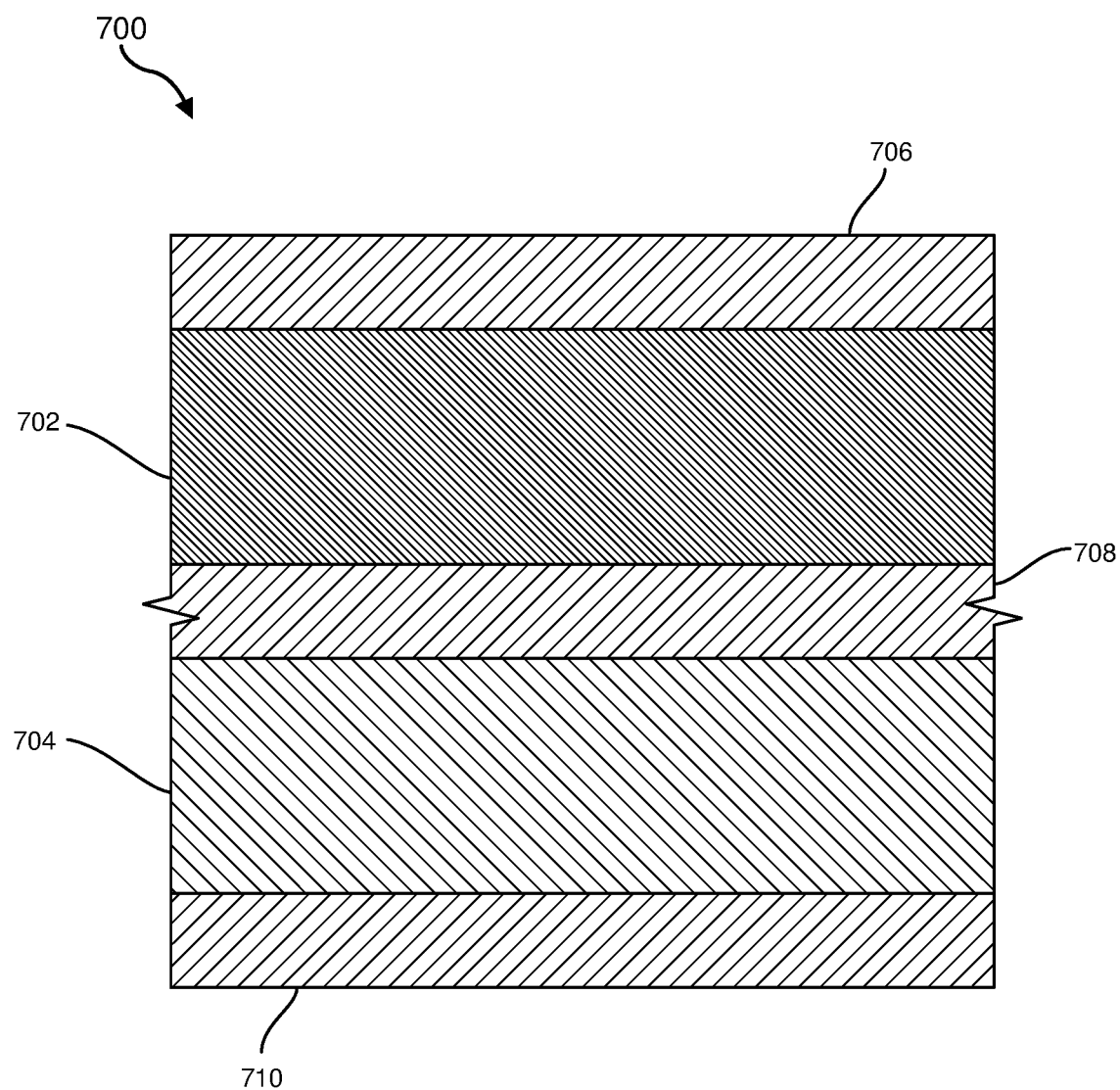
FIG. 7 is a cross-sectional view of a haptic actuator with a tunable stiffness material, according to at least one embodiment of the present disclosure.

FIG. 7 is a cross-sectional view of a haptic actuator 700, according to at least one embodiment of the present disclosure. In some respects, the haptic actuator 700 of FIG. 7 may be similar to the haptic actuator 300 described above with reference to FIG. 3. For example, the haptic actuator 700 may include a vibrotactile actuator 702 and a tunable stiffness material 704 coupled to the vibrotactile actuator 702.

As illustrated in FIG. 7, the vibrotactile actuator 702 may be operated (e.g., vibrated) by application of an electrical voltage between a first electrode 706 on a first side of the vibrotactile actuator 702 and a second electrode 708 on a second, opposite side of the vibrotactile actuator 702. The tunable stiffness material 704 may be operated (e.g., to alter a stiffness thereof) by application of an electrical voltage thereto. In some examples, the voltage applied to the tunable stiffness material 704 may be applied between the second electrode 708 and a third electrode 710 on an opposite side of the tunable stiffness material 704 from the second electrode 708. In this configuration, the second electrode 708 may act as a common electrode (e.g., ground) used for operation of both the vibrotactile actuator 702 and the tunable stiffness material 704. In other examples, the second electrode 708 may be replaced by two electrodes separated by an electrically insulating material. The two separate electrodes may be positioned and configured for operating the vibrotactile actuator 702 and the tunable stiffness material 704, respectively.

Figure 8:
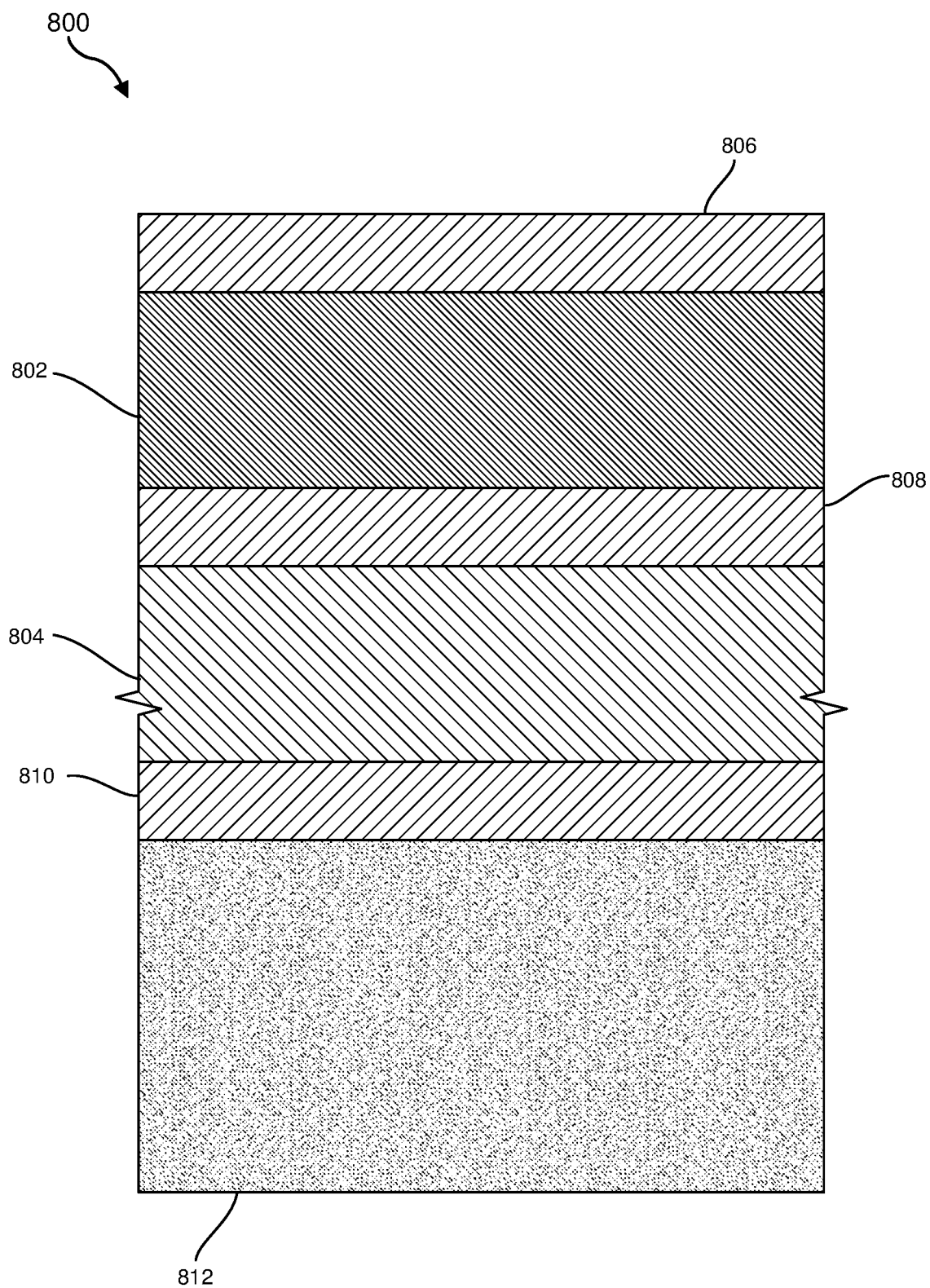
FIG. 8 is a cross-sectional view of a haptic actuator with a backing structure, according to at least one embodiment of the present disclosure.

FIG. 8 is a cross-sectional view of a haptic actuator 800, according to at least one additional embodiment of the present disclosure. In some respects, the haptic actuator 800 of FIG. 8 may be similar to the haptic actuator 300 of FIG. 3. For example, the haptic actuator 800 may include a vibrotactile actuator 802 and a tunable stiffness material 804 coupled to the vibrotactile actuator 802.

As illustrated in FIG. 8, the haptic actuator 800 may include a first electrode 806 disposed on a side of the vibrotactile actuator 802 opposite the tunable stiffness material 804, a second electrode 808 disposed between the vibrotactile actuator 802 and the tunable stiffness material 804, and a third electrode 810 disposed on a side of the tunable stiffness material 804 opposite the vibrotactile actuator 802.

Additionally, the haptic actuator 800 may include a backing structure 812 that may have material properties configured to improve a haptic sensation induced by the vibrotactile actuator 802 against the user's skin. In some cases, absent the backing structure 812, a significant portion of vibrational energy of the vibrotactile actuator 802 may be dissipated by movement of the vibrotactile actuator 802 away from the user's skin. The backing structure 812 may provide a stop to direct the vibrational energy back toward the user's skin, increasing a haptic sensation caused by the haptic actuator 800. For example, in the perspective of FIG. 8, the haptic actuator 800 may be configured for use against a user's skin positioned at an upper side of the haptic actuator 800. The backing structure 812 may be positioned adjacent to the haptic actuator 800 opposite the user's skin. The backing structure 812 may be physically coupled to the haptic actuator 800, such as via an adhesive or one or more fasteners, or the backing structure 812 may be positioned adjacent to the haptic actuator 800 without a physical coupling.

Material properties of the backing structure 812 may be selected to advantageously direct the vibrational energy toward the user's skin while avoiding unnecessary absorption or dampening of the vibrations. For example, if the backing structure 812 is formed of a material that is too stiff, the backing structure 812 might dampen the vibrations. On the other hand, if the backing structure 812 is formed of a material that is too soft, the backing structure 812 might not adequately perform its intended function of directing the vibrational energy toward the user's skin. Thus, the material of the backing structure 812 may be selected to direct the vibrational energy as desired without overly dampening the vibration. By way of example and not limitation, the backing structure 812 may be formed of a compressible porous material, such as a close-celled or open-celled foam material (e.g., polyurethane foam, polystyrene foam, polyethylene foam, etc.).

FIG. 9 is a block diagram of an artificial-reality system 900, according to at least one embodiment of the present disclosure. The artificial-reality system 900 may include a wearable device 902 and a head-mounted display system 904 that is in communication with the wearable device 902. The head-mounted display system 904 may be configured to display visual content to a user, such as with a near-eye display (e.g., a virtual-reality headset, augmented-reality glasses, etc.). The wearable device 902 may be configured to induce a haptic sensation against the user's skin. The wearable device 902 may be or include a glove, a wristband, a wristwatch, an armband, a headband, a leg band, etc.

The wearable device 902 may include one or more actuators 906(1) . . . 906(n) for inducing the haptic sensation. For example, the actuators 906(1) . . . 906(n) may be configured as any of the vibrotactile actuators described above with reference to FIGS. 1-3 and 5-8. One or more corresponding tunable stiffness materials 908(1) . . . 908(n) may be respectively coupled to the actuators 906(1) . . . 906(n). As explained above, the tunable stiffness materials 908(1) . . . 908(n) may be configured to change in stiffness to alter a resonant frequency of the actuators 906(1) . . . 906(n).

The wearable device 902 may include a haptic controller 910 for controlling operation of the actuators 906(1) . . . 906(n) and of the tunable stiffness materials 908(1) . . . 908(n). The haptic controller 910 may include a local processor 912, a frequency controller 914 operatively coupled to the local processor 912 and configured to regulate an electrical frequency at which the actuators 906(1) . . . 906(n) may be driven, and an actuator driver 916 for applying a voltage to the actuators 906(1) . . . 906(n). The local processor 912 may include a wireless or wired communications unit to receive control signals indicative of desired haptic feedback content from the head-mounted display system 904. The local processor 912 may decode the control signals and may provide haptic feedback content to the frequency controller 914. The frequency controller 914 may convert the haptic feedback content into voltage waveforms (e.g., sinewave, sawtooth, square, triangle, chirp, etc.) of varying amplitude, frequency, duty cycle, modulation (e.g., amplitude modulation, frequency modulation, etc.), and/or envelope suitable to drive the actuators 906(1) . . . 906(n). The actuator driver 916 may receive the voltage waveforms from the frequency controller 914 and may condition the waveforms to drive the actuators 906(1) . . . 906(n), thereby providing vibrational haptic feedback to the user. The actuator driver 916 may perform impedance matching, level shifting, amplification, etc., to drive the actuators 906(1) . . . 906(n).

Although the frequency controller 914 is illustrated as a separate element from the local processor 912 and the actuator driver 916, in some embodiments the frequency controller 914 may be integrated as part of the local processor 912 and/or as part of the actuator driver 916. The actuator driver 916 may be operatively coupled to the actuators 906(1) . . . 906(n), such as to a first electrode 920 of each of the actuators 906(1) . . . 906(n). In some examples, a second electrode 922 of each of the actuators 906(1) . . . 906(n) may be connected to an electrical ground.

The haptic controller 910 may also include a tunable material controller 918 for controlling the stiffness of the tunable stiffness materials 908(1) . . . 908(n). The tunable material controller 918 may be operatively coupled to the local processor 912 to receive instructions from the local processor 912.

In some embodiments, the wearable device 902 may include a force sensor circuit 924 operatively coupled to one or more of the actuators 906(1) . . . 906(n). Flexible haptic vibrotactile actuators may be vibrated by the application of a suitable voltage thereto. Conversely, physically deforming such flexible haptic vibrotactile actuators may create a feedback voltage that can be sensed. The force sensor circuit 924 may sense such a feedback voltage created by physical deformation of the actuators 906(1) . . . 906(n). This feedback voltage may be used to determine a force that may be pressing against the actuators 906(1) . . . 906(n), either by the force sensor circuit 924 or by the local processor 912. The force sensor circuit 924 may be operatively coupled to the local processor 912 to send data to the local processor 912 indicative of a force applied against the actuators 906(1) . . . 906(n).

The level of force by which the actuators 906(1) . . . 906(n) press against the user's skin may be used by the local processor 912 to determine an appropriate frequency for driving vibration of the actuators 906(1) . . . 906(n). The force may also be used to determine an appropriate level of stiffness of the tunable stiffness materials 908(1) . . . 908(n). In addition, a frequency at which the wearable device 902 vibrates when one or more of the actuators 906(1) . . . 906(n) is activated may be sensed and adjusted as desired. For example, a constant or near-constant (or otherwise desired) frequency response may be maintained by adjusting the stiffness of the tunable stiffness materials 908(1) . . . 908(n) even when boundary conditions change, such as due to wearing the wearable device 902 tighter or looser or shifting the wearable device 902 on the user's body part. Thus, the overall frequency of the wearable device 902 may be periodically or constantly sensed and the tunable stiffness materials 908(1) . . . 908(n) may be adjusted to result in a desired frequency response at any time.

By way of example, if one of the actuators 906(1) is identified (e.g., by the force sensor circuit 924 and/or by the local processor 912 using data from the force sensor circuit 924) as pressing relatively firmly against the user's skin (e.g., by being positioned over a bone), the haptic controller 910 may determine that a lower vibrational frequency is appropriate. As a result, the haptic controller 910 may reduce a stiffness of one of the tunable materials 908(1) coupled to the actuator 906(1) to lower a resonant frequency of the actuator 906(1). The haptic controller 910 may then drive the vibration of the actuator 906(1) at the lower resonant frequency.

In a converse example, if another actuator 906(n) is identified (e.g., by the force sensor circuit 924 and/or by the local processor 912 using data from the force sensor circuit 924) as pressing relatively softly against the user's skin (e.g., by being positioned over a fleshy body part), the haptic controller 910 may determine that a higher vibrational frequency is appropriate. Therefore, the haptic controller 910 may increase a stiffness of another tunable stiffness material 908(n) coupled to the actuator 906(n) to lower a resonant frequency of the actuator 906(n). The haptic controller 910 may then drive the vibration of the actuator 906(n) at the higher resonant frequency.

As noted above, the head-mounted display system 904 may be in communication with the wearable device 902. The communication may be provided wirelessly or via a wired connection. The head-mounted display system 904 may send commands to the local processor 912 of the wearable device 902 to indicate when the actuators 906(1) . . . 906(n) should be activated. For example, the actuators 906(1) . . . 906(n) may be actuated to coincide with visual content displayed to the user on a head-mounted display. For example, a haptic vibrotactile signal may be provided to the user's skin with the actuators 906(1) . . . 906(n) in temporal synchronization with the display of visual content on the head-mounted display.

In one example, the user may view a virtual finger that appears to touch a virtual object in an artificial-reality environment, such as through a virtual-reality headset. At the same time, an actuator in a corresponding glove finger may be vibrated to induce a sensation of touching the virtual object. A frequency at which the actuator in the glove finger is vibrated may be altered as explained above, such as to correspond to a perceived harder or softer touch of the virtual object.

FIG. 10 is a flow diagram of a method 1000 of forming a wearable device, according to at least one embodiment of the present disclosure. At operation 1010, a tunable stiffness material may be coupled adjacent to a flexible haptic actuator. Operation 1010 may be performed in a variety of ways. For example, the tunable stiffness material may be adhered, fastened (e.g., with one or more screws, rivets, or pins), sewn, or otherwise coupled to the flexible haptic actuator. The tunable stiffness material may have an adjustable stiffness such that adjustment of the stiffness of the tunable stiffness material alters a haptic sensation induced by the flexible haptic actuator.

Example materials for the flexible haptic actuator include electroactive polymers, such as a dielectric electroactive polymer material, a ferroelectric polymer material, an electrostrictive graft polymer material, a liquid crystalline polymer material, an ionic electroactive polymer material, an electrorheological fluid material, an ionic polymer-metal composite material, and/or a hydrogel material. Example materials for the tunable stiffness material include a shape memory alloy material, an electroplastic elastomer hydrogel material, a conductive elastomer material, and/or a temperature-sensitive gel material.

In some embodiments, a backing structure may be coupled to the tunable stiffness material and flexible haptic actuator. The backing structure may be or include the backing structure 812 described above with reference to FIG. 8. For example, the backing structure may include a porous material (e.g., a compressible porous material).

In some embodiments, a force sensor circuit may be electrically coupled to the flexible haptic actuator. The force sensor circuit may be configured to sense data from the flexible haptic actuator that is indicative of a force between the flexible haptic actuator and a user's body part. For example, the force sensor circuit may be configured to operate as described above with reference to the force sensor circuit 924 illustrated in FIG. 9.

In some embodiments, a guide structure may be positioned adjacent to the flexible haptic actuator. The guide structure may be configured to constrain vibration of the flexible haptic actuator to a desired direction, such as toward a user's skin.

At operation 1020, the tunable stiffness material and the flexible haptic actuator may be positioned on or in a body of a wearable device that is shaped and sized to be worn against a user's body part. Operation 1020 may be performed in a variety of ways. For example, the tunable stiffness material and the flexible haptic actuator may be positioned on or in a glove, a wristband, a wristwatch, an armband, a headband, or a leg band. The flexible haptic actuator may be positioned in the wearable device to be adjacent to the user's skin in order to induce a haptic sensation in the user's skin.

Accordingly, the present disclosure includes wearable devices, artificial-reality systems, and related methods that may employ a flexible haptic actuator coupled to a tunable stiffness material. Adjusting a stiffness of the tunable stiffness material may alter at least one operating characteristic (e.g., resonant frequency) of the flexible haptic actuator. These adjustments can be made during operation and use, such as to induce different haptic sensations and/or for mechanical impedance matching with a body part of a user that is adjacent to the flexible haptic actuator.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 1100 in FIG. 11) or that visually immerses a user in an artificial reality (such as, e.g., virtual-reality system 1200 in FIG. 12). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 11:
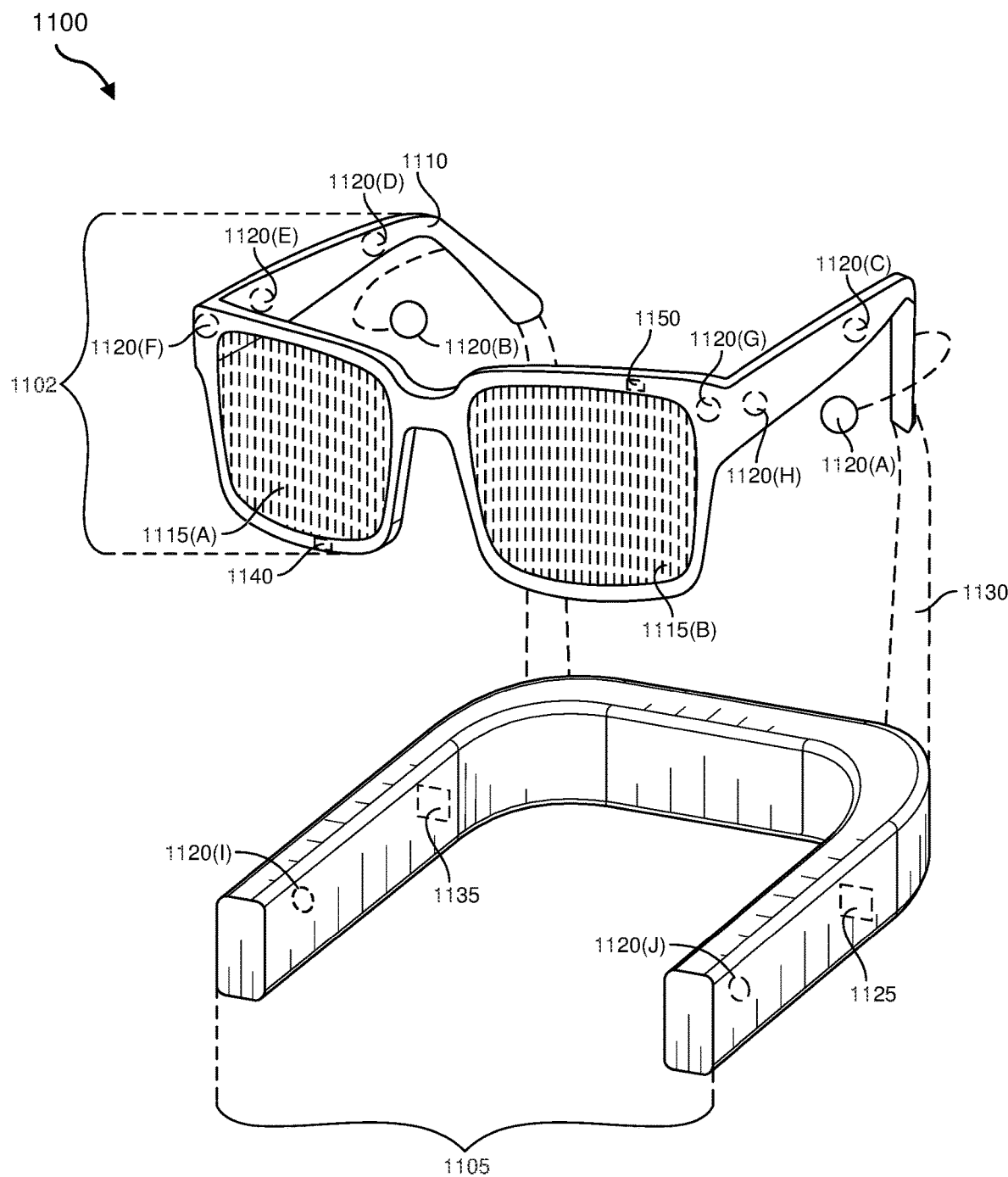
FIG. 11 is an illustration of exemplary augmented-reality glasses that may be used in connection with embodiments of this disclosure.

Turning to FIG. 11, the augmented-reality system 1100 may include an eyewear device 1102 with a frame 1110 configured to hold a left display device 1115(A) and a right display device 1115(B) in front of a user's eyes. The display devices 1115(A) and 1115(B) may act together or independently to present an image or series of images to a user. While the augmented-reality system 1100 includes two displays, embodiments of this disclosure may be implemented in augmented-reality systems with a single NED or more than two NEDs.

In some embodiments, the augmented-reality system 1100 may include one or more sensors, such as sensor 1140. The sensor 1140 may generate measurement signals in response to motion of the augmented-reality system 1100 and may be located on substantially any portion of the frame 1110. The sensor 1140 may represent one or more of a variety of different sensing mechanisms, such as a position sensor, an inertial measurement unit (IMU), a depth camera assembly, a structured light emitter and/or detector, or any combination thereof. In some embodiments, the augmented-reality system 1100 may or may not include the sensor 1140 or may include more than one sensor. In embodiments in which the sensor 1140 includes an IMU, the IMU may generate calibration data based on measurement signals from the sensor 1140. Examples of the sensor 1140 may include, without limitation, accelerometers, gyroscopes, magnetometers, other suitable types of sensors that detect motion, sensors used for error correction of the IMU, or some combination thereof.

In some examples, the augmented-reality system 1100 may also include a microphone array with a plurality of acoustic transducers 1120(A)-1120(J), referred to collectively as acoustic transducers 1120. The acoustic transducers 1120 may represent transducers that detect air pressure variations induced by sound waves. Each acoustic transducer 1120 may be configured to detect sound and convert the detected sound into an electronic format (e.g., an analog or digital format). The microphone array in FIG. 11 may include, for example, ten acoustic transducers: 1120(A) and 1120(B), which may be designed to be placed inside a corresponding ear of the user, acoustic transducers 1120(C), 1120(D), 1120(E), 1120(F), 1120(G), and 1120(H), which may be positioned at various locations on the frame 1110, and/or acoustic transducers 1120(I) and 1120(J), which may be positioned on a corresponding neckband 1105.

In some embodiments, one or more of the acoustic transducers 1120(A)-(J) may be used as output transducers (e.g., speakers). For example, the acoustic transducers 1120(A) and/or 1120(B) may be earbuds or any other suitable type of headphone or speaker.

The configuration of the acoustic transducers 1120 of the microphone array may vary. While the augmented-reality system 1100 is shown in FIG. 11 as having ten acoustic transducers 1120, the number of acoustic transducers 1120 may be greater or less than ten. In some embodiments, using higher numbers of the acoustic transducers 1120 may increase the amount of audio information collected and/or the sensitivity and accuracy of the audio information. In contrast, using a lower number of the acoustic transducers 1120 may decrease the computing power required by an associated controller 1150 to process the collected audio information. In addition, the position of each acoustic transducer 1120 of the microphone array may vary. For example, the position of an acoustic transducer 1120 may include a defined position on the user, a defined coordinate on the frame 1110, an orientation associated with each acoustic transducer 1120, or some combination thereof.

The acoustic transducers 1120(A) and 1120(B) may be positioned on different parts of the user's ear, such as behind the pinna, behind the tragus, and/or within the auricle or fossa. Or, there may be additional acoustic transducers 1120 on or surrounding the ear in addition to the acoustic transducers 1120 inside the ear canal. Having an acoustic transducer 1120 positioned next to an ear canal of a user may enable the microphone array to collect information on how sounds arrive at the ear canal. By positioning at least two of the acoustic transducers 1120 on either side of a user's head (e.g., as binaural microphones), the augmented-reality device 1100 may simulate binaural hearing and capture a 3D stereo sound field around about a user's head. In some embodiments, the acoustic transducers 1120(A) and 1120(B) may be connected to the augmented-reality system 1100 via a wired connection 1130, and in other embodiments the acoustic transducers 1120(A) and 1120(B) may be connected to the augmented-reality system 1100 via a wireless connection (e.g., a BLUETOOTH connection). In still other embodiments, the acoustic transducers 1120(A) and 1120(B) may not be used at all in conjunction with the augmented-reality system 1100.

The acoustic transducers 1120 on the frame 1110 may be positioned in a variety of different ways, including along the length of the temples, across the bridge, above or below the display devices 1115(A) and 1115(B), or some combination thereof. The acoustic transducers 1120 may also be oriented such that the microphone array is able to detect sounds in a wide range of directions surrounding the user wearing the augmented-reality system 1100. In some embodiments, an optimization process may be performed during manufacturing of the augmented-reality system 1100 to determine relative positioning of each acoustic transducer 1120 in the microphone array.

In some examples, the augmented-reality system 1100 may include or be connected to an external device (e.g., a paired device), such as neckband 1105. The neckband 1105 generally represents any type or form of paired device. Thus, the following discussion of the neckband 1105 may also apply to various other paired devices, such as charging cases, smart watches, smart phones, wristbands, other wearable devices, hand-held controllers, tablet computers, laptop computers, other external compute devices, etc.

As shown, the neckband 1105 may be coupled to the eyewear device 1102 via one or more connectors. The connectors may be wired or wireless and may include electrical and/or non-electrical (e.g., structural) components. In some cases, the eyewear device 1102 and the neckband 1105 may operate independently without any wired or wireless connection between them. While FIG. 11 illustrates the components of the eyewear device 1102 and neckband 1105 in example locations on the eyewear device 1102 and neckband 1105, the components may be located elsewhere and/or distributed differently on the eyewear device 1102 and/or neckband 1105. In some embodiments, the components of the eyewear device 1102 and neckband 1105 may be located on one or more additional peripheral devices paired with the eyewear device 1102, the neckband 1105, or some combination thereof.

Pairing external devices, such as the neckband 1105, with augmented-reality eyewear devices may enable the eyewear devices to achieve the form factor of a pair of glasses while still providing sufficient battery and computation power for expanded capabilities. Some or all of the battery power, computational resources, and/or additional features of the augmented-reality system 1100 may be provided by a paired device or shared between a paired device and an eyewear device, thus reducing the weight, heat profile, and form factor of the eyewear device overall while still retaining desired functionality. For example, the neckband 1105 may allow components that would otherwise be included on an eyewear device to be included in the neckband 1105 since users may tolerate a heavier weight load on their shoulders than they would tolerate on their heads. The neckband 1105 may also have a larger surface area over which to diffuse and disperse heat to the ambient environment. Thus, the neckband 1105 may allow for greater battery and computation capacity than might otherwise have been possible on a stand-alone eyewear device. Since weight carried in the neckband 1105 may be less invasive to a user than weight carried in the eyewear device 1102, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

The neckband 1105 may be communicatively coupled with the eyewear device 1102 and/or to other devices. These other devices may provide certain functions (e.g., tracking, localizing, depth mapping, processing, storage, etc.) to the augmented-reality system 1100. In the embodiment of FIG. 11, the neckband 1105 may include two acoustic transducers (e.g., 1120(1) and 1120(J)) that are part of the microphone array (or potentially form their own microphone subarray). The neckband 1105 may also include a controller 1125 and a power source 1135.

The acoustic transducers 1120(1) and 1120(J) of the neckband 1105 may be configured to detect sound and convert the detected sound into an electronic format (analog or digital). In the embodiment of FIG. 11, the acoustic transducers 1120(1) and 1120(J) may be positioned on the neckband 1105, thereby increasing the distance between the neckband acoustic transducers 1120(1) and 1120(J) and other acoustic transducers 1120 positioned on the eyewear device 1102. In some cases, increasing the distance between the acoustic transducers 1120 of the microphone array may improve the accuracy of beamforming performed via the microphone array. For example, if a sound is detected by the acoustic transducers 1120(C) and 1120(D) and the distance between the acoustic transducers 1120(C) and 1120(D) is greater than, e.g., the distance between the acoustic transducers 1120(D) and 1120(E), the determined source location of the detected sound may be more accurate than if the sound had been detected by the acoustic transducers 1120(D) and 1120(E).

The controller 1125 of the neckband 1105 may process information generated by the sensors on the neckband 1105 and/or augmented-reality system 1100. For example, the controller 1125 may process information from the microphone array that describes sounds detected by the microphone array. For each detected sound, the controller 1125 may perform a direction-of-arrival (DOA) estimation to estimate a direction from which the detected sound arrived at the microphone array. As the microphone array detects sounds, the controller 1125 may populate an audio data set with the information. In embodiments in which the augmented-reality system 1100 includes an inertial measurement unit, the controller 1125 may compute all inertial and spatial calculations from the IMU located on the eyewear device 1102. A connector may convey information between the augmented-reality system 1100 and the neckband 1105 and between the augmented-reality system 1100 and the controller 1125. The information may be in the form of optical data, electrical data, wireless data, or any other transmittable data form. Moving the processing of information generated by the augmented-reality system 1100 to the neckband 1105 may reduce weight and heat in the eyewear device 1102, making it more comfortable to the user.

The power source 1135 in the neckband 1105 may provide power to the eyewear device 1102 and/or to the neckband 1105. The power source 1135 may include, without limitation, lithium ion batteries, lithium-polymer batteries, primary lithium batteries, alkaline batteries, or any other form of power storage. In some cases, the power source 1135 may be a wired power source. Including the power source 1135 on the neckband 1105 instead of on the eyewear device 1102 may help better distribute the weight and heat generated by power source 1135.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1200 in FIG. 12, that mostly or completely covers a user's field of view. The virtual-reality system 1200 may include a front rigid body 1202 and a band 1204 shaped to fit around a user's head. The virtual-reality system 1200 may also include output audio transducers 1206(A) and 1206(B). Furthermore, while not shown in FIG. 12, the front rigid body 1202 may include one or more electronic elements, including one or more electronic displays, one or more inertial measurement units (IMUS), one or more tracking emitters or detectors, and/or any other suitable device or system for creating an artificial-reality experience.

Artificial-reality systems may include a variety of types of visual feedback mechanisms. For example, display devices in the augmented-reality system 1100 and/or the virtual-reality system 1200 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in the augmented-reality system 1100 and/or virtual-reality system 1200 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, the augmented-reality system 1100 and/or virtual-reality system 1200 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

As noted, the artificial-reality systems 1100 and 1200 may be used with a variety of other types of devices to provide a more compelling artificial-reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 13:
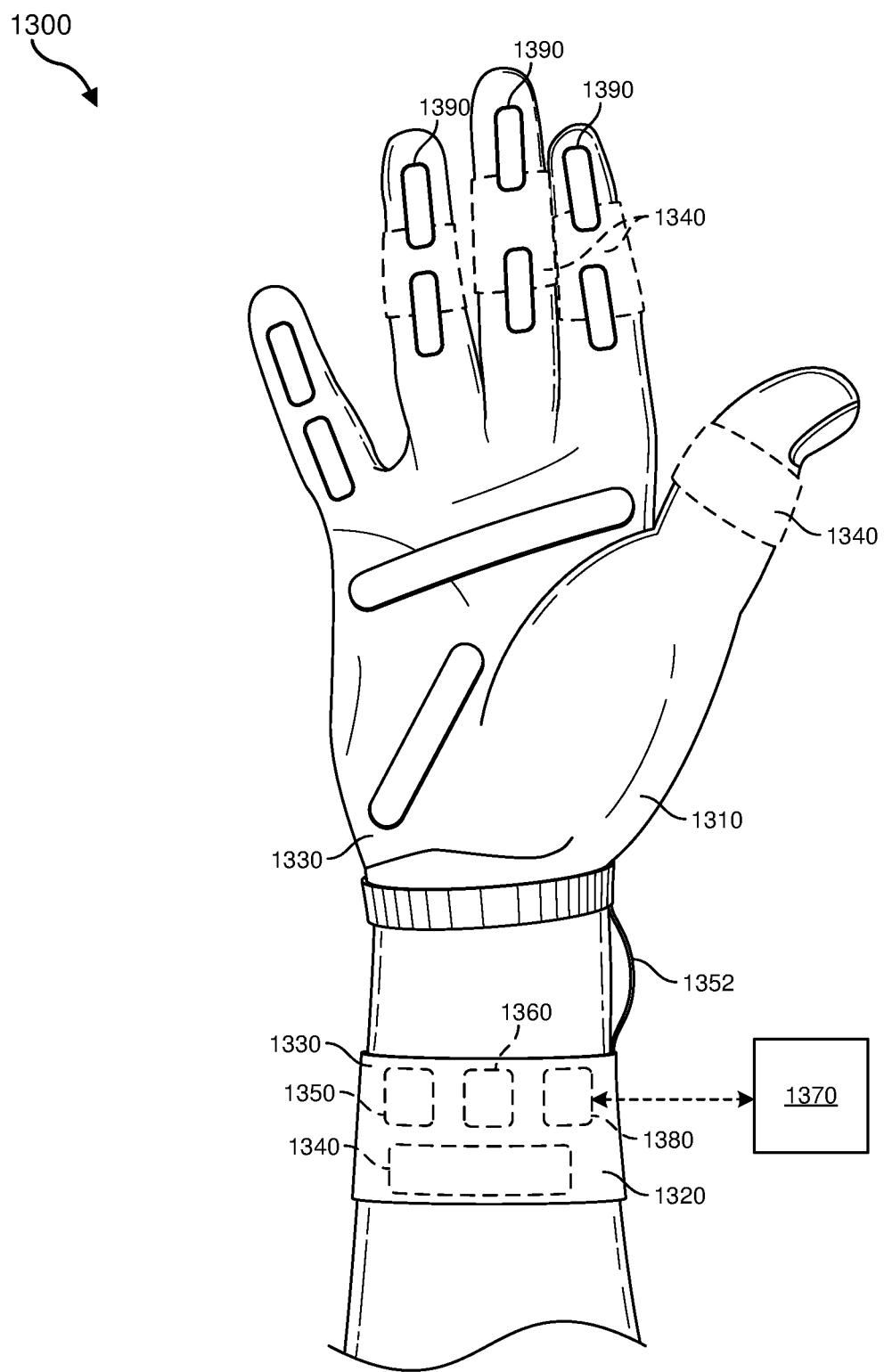
FIG. 13 is an illustration of exemplary haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 13 illustrates a vibrotactile system 1300 in the form of a wearable glove (haptic device 1310) and wristband (haptic device 1320). The haptic device 1310 and the haptic device 1320 are shown as examples of wearable devices that include a flexible, wearable textile material 1330 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more vibrotactile devices 1340 may be positioned at least partially within one or more corresponding pockets formed in the textile material 1330 of the vibrotactile system 1300. The vibrotactile devices 1340 may be positioned in locations to provide a vibrating sensation (e.g., haptic feedback) to a user of the vibrotactile system 1300. For example, the vibrotactile devices 1340 may be positioned against the user's finger(s), thumb, or wrist, as shown in FIG. 13. The vibrotactile devices 1340 may, in some examples, be sufficiently flexible to conform to or bend with the user's corresponding body part(s).

A power source 1350 (e.g., a battery) for applying a voltage to the vibrotactile devices 1340 for activation thereof may be electrically coupled to the vibrotactile devices 1340, such as via conductive wiring 1352. In some examples, each of the vibrotactile devices 1340 may be independently electrically coupled to the power source 1350 for individual activation. In some embodiments, a processor 1360 may be operatively coupled to the power source 1350 and configured (e.g., programmed) to control activation of the vibrotactile devices 1340.

The vibrotactile system 1300 may be implemented in a variety of ways. In some examples, the vibrotactile system 1300 may be a standalone system with integral subsystems and components for operation independent of other devices and systems. As another example, the vibrotactile system 1300 may be configured for interaction with another device or system 1370. For example, the vibrotactile system 1300 may, in some examples, include a communications interface 1380 for receiving and/or sending signals to the other device or system 1370. The other device or system 1370 may be a mobile device, a gaming console, an artificial-reality (e.g., virtual-reality, augmented-reality, mixed-reality) device, a personal computer, a tablet computer, a network device (e.g., a modem, a router, etc.), a handheld controller, etc. The communications interface 1380 may enable communications between the vibrotactile system 1300 and the other device or system 1370 via a wireless (e.g., Wi-Fi, BLUETOOTH, cellular, radio, etc.) link or a wired link. If present, the communications interface 1380 may be in communication with the processor 1360, such as to provide a signal to the processor 1360 to activate or deactivate one or more of the vibrotactile devices 1340.

The vibrotactile system 1300 may optionally include other subsystems and components, such as touch-sensitive pads 1390, pressure sensors, motion sensors, position sensors, lighting elements, and/or user interface elements (e.g., an on/off button, a vibration control element, etc.). During use, the vibrotactile devices 1340 may be configured to be activated for a variety of different reasons, such as in response to the user's interaction with user interface elements, a signal from the motion or position sensors, a signal from the touch-sensitive pads 1390, a signal from the pressure sensors, a signal from the other device or system 1370, etc.

Although the power source 1350, processor 1360, and communications interface 1380 are illustrated in FIG. 13 as being positioned in the haptic device 1320, the present disclosure is not so limited. For example, one or more of the power source 1350, processor 1360, or communications interface 1380 may be positioned within the haptic device 1310 or within another wearable textile.

Figure 14:
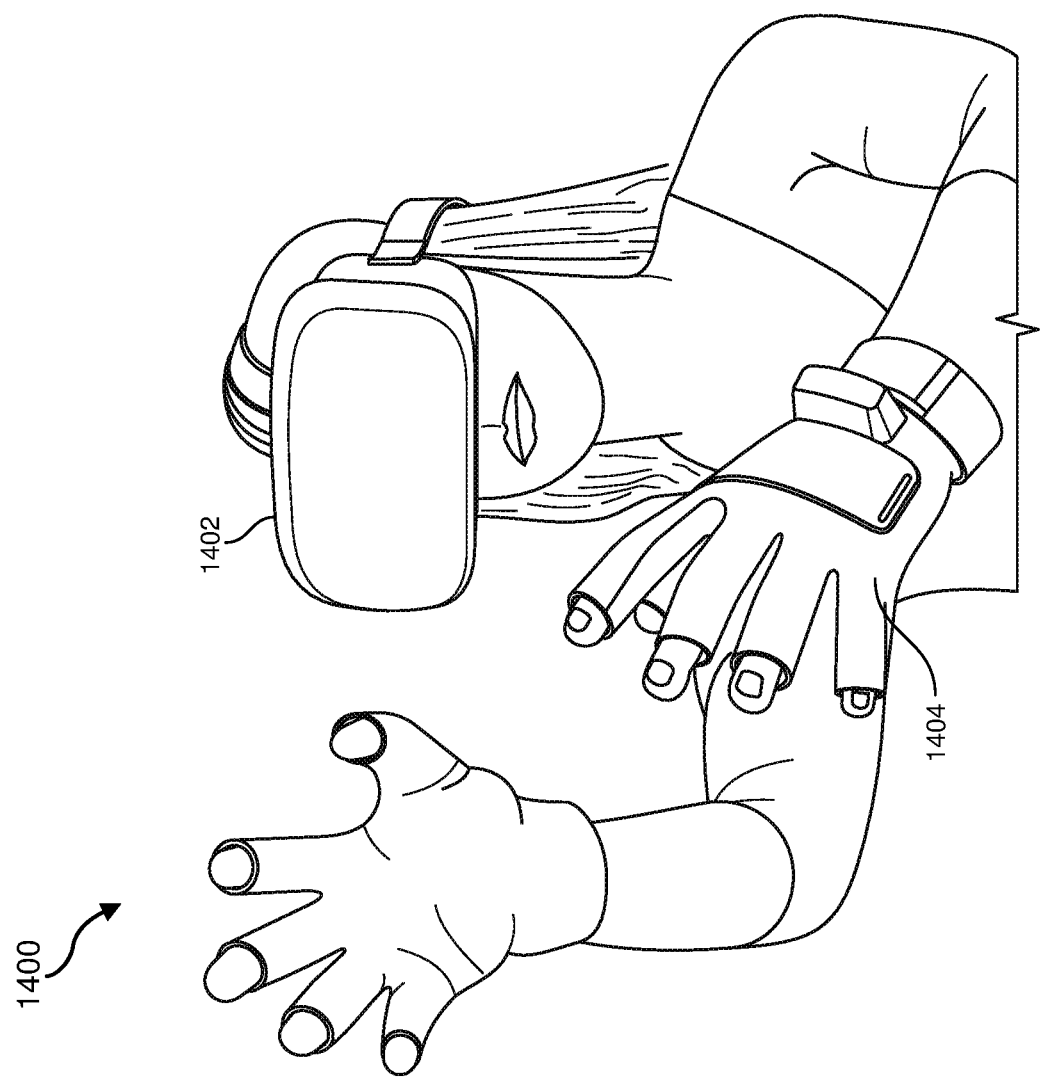
FIG. 14 is an illustration of an exemplary virtual-reality environment according to embodiments of this disclosure.

Haptic wearables, such as those shown in and described in connection with FIG. 13, may be implemented in a variety of types of artificial-reality systems and environments. FIG. 14 shows an example artificial-reality environment 1400 including one head-mounted virtual-reality display and two haptic devices (i.e., gloves), and in other embodiments any number and/or combination of these components and other components may be included in an artificial-reality system. For example, in some embodiments there may be multiple head-mounted displays each having an associated haptic device, with each head-mounted display and each haptic device communicating with the same console, portable computing device, or other computing system.

Figure 12:
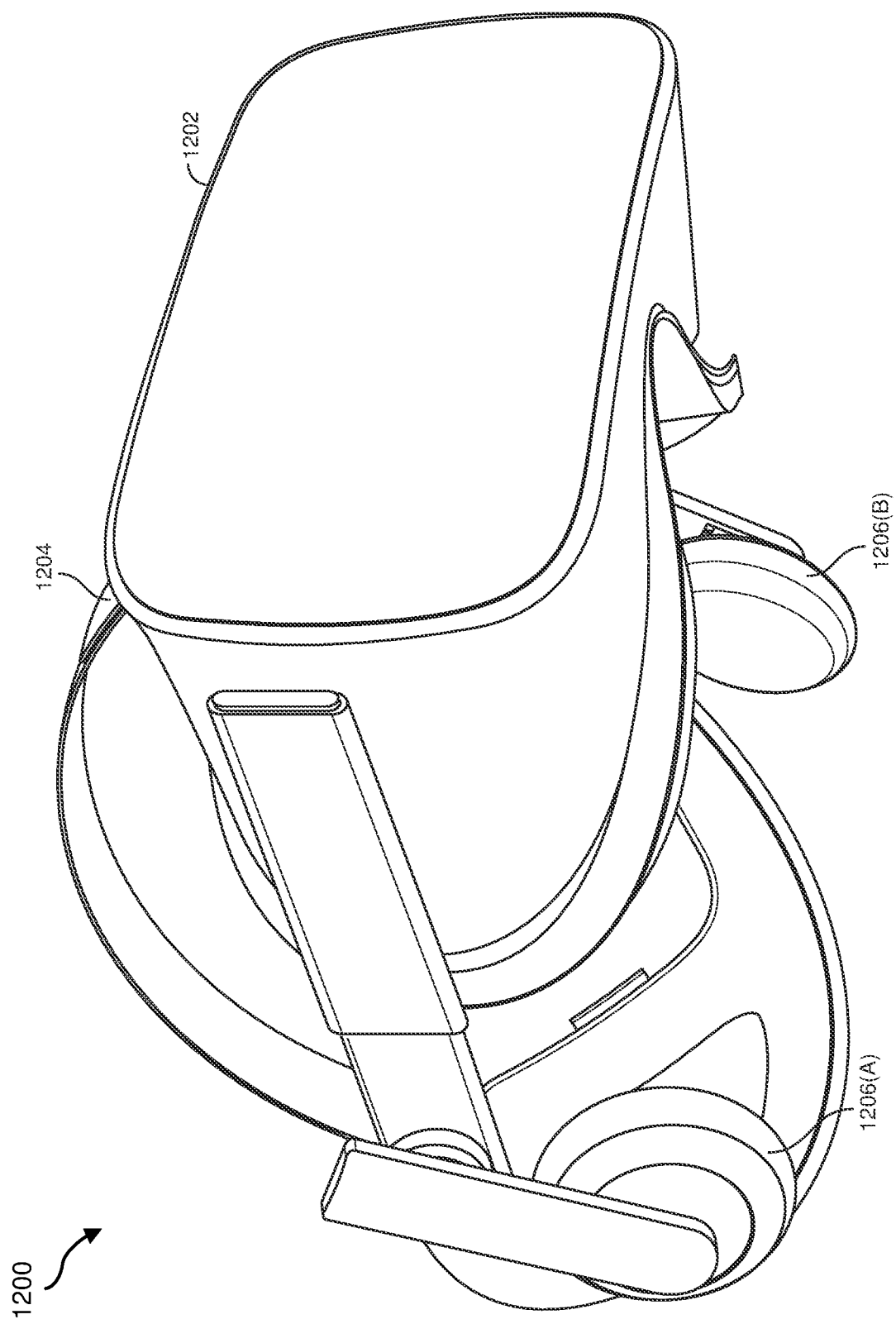
FIG. 12 is an illustration of an exemplary virtual-reality headset that may be used in connection with embodiments of this disclosure.

A head-mounted display 1402 generally represents any type or form of virtual-reality system, such as the virtual-reality system 1200 in FIG. 12. A haptic device 1404 generally represents any type or form of wearable device, worn by a user of an artificial-reality system, that provides haptic feedback to the user to give the user the perception that he or she is physically engaging with a virtual object. In some embodiments, the haptic device 1404 may provide haptic feedback by applying vibration, motion, and/or force to the user. For example, the haptic device 1404 may limit or augment a user's movement. To give a specific example, the haptic device 1404 may limit a user's hand from moving forward so that the user has the perception that his or her hand has come in physical contact with a virtual wall. In this specific example, one or more actuators within the haptic device may achieve the physical-movement restriction by pumping fluid into an inflatable bladder of the haptic device. In some examples, a user may also use the haptic device 1404 to send action requests to a console. Examples of action requests include, without limitation, requests to start an application and/or end the application and/or requests to perform a particular action within the application.

Figure 15:
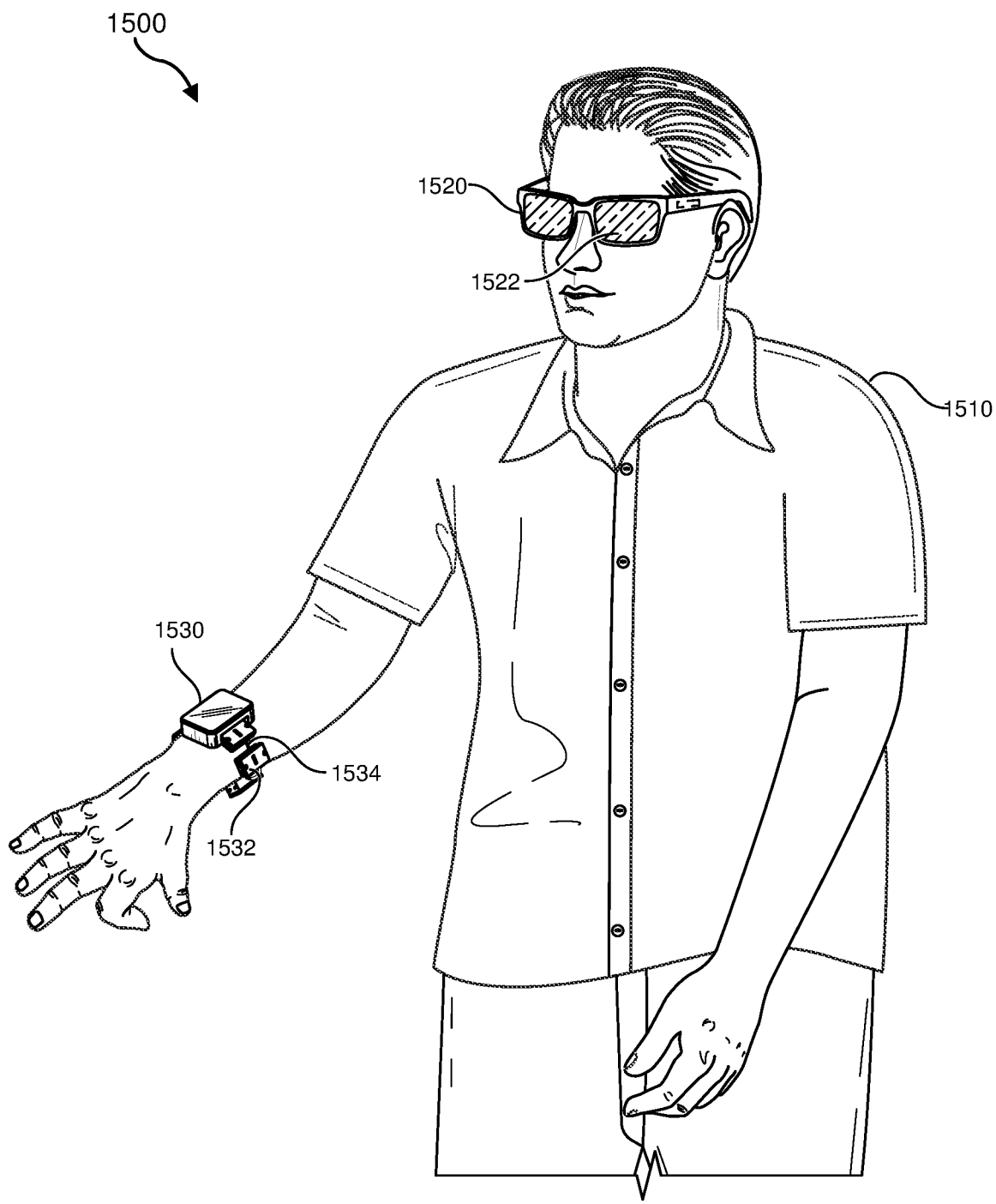
FIG. 15 is an illustration of an exemplary augmented-reality environment according to embodiments of this disclosure.

While haptic interfaces may be used with virtual-reality systems, as shown in FIG. 14, haptic interfaces may also be used with augmented-reality systems, as shown in FIG. 15. FIG. 15 is a perspective view of a user 1510 interacting with an augmented-reality system 1500. In this example, the user 1510 may wear a pair of augmented-reality glasses 1520 that may have one or more displays 1522 and that are paired with a haptic device 1530. In this example, the haptic device 1530 may be a wristband that includes a plurality of band elements 1532 and a tensioning mechanism 1534 that connects the band elements 1532 to one another.

One or more of the band elements 1532 may include any type or form of actuator suitable for providing haptic feedback. For example, one or more of the band elements 1532 may be configured to provide one or more of various types of cutaneous feedback, including vibration, force, traction, texture, and/or temperature. To provide such feedback, the band elements 1532 may include one or more of various types of actuators. In one example, each of the band elements 1532 may include a vibrotactor (e.g., a vibrotactile actuator) configured to vibrate in unison or independently to provide one or more of various types of haptic sensations to a user. Alternatively, only a single band element or a subset of band elements may include vibrotactors.

The haptic devices 1310, 1320, 1404, and 1530 may include any suitable number and/or type of haptic transducer, sensor, and/or feedback mechanism. For example, the haptic devices 1310, 1320, 1404, and 1530 may include one or more mechanical transducers, piezoelectric transducers, and/or fluidic transducers. The haptic devices 1310, 1320, 1404, and 1530 may also include various combinations of different types and forms of transducers that work together or independently to enhance a user's artificial-reality experience. In one example, each of the band elements 1532 of the haptic device 1530 may include a vibrotactor (e.g., a vibrotactile actuator) configured to vibrate in unison or independently to provide one or more of various types of haptic sensations to a user.

The following example embodiments are also included in this disclosure:

Example 1: A wearable device may include: a body shaped and sized to be worn against a user's skin; a flexible vibrotactile actuator positioned on or in the body in a location to transmit a haptic sensation to the user's skin when the body is worn by the user; and a tunable stiffness material adjacent to the flexible haptic actuator, wherein the tunable stiffness material has an adjustable stiffness such that adjustment of the stiffness of the tunable stiffness material alters a haptic sensation induced by the flexible haptic actuator against the user's skin.

Example 2: The wearable device of Example 1, wherein the tunable stiffness material comprises at least one of the following materials: a shape memory alloy material; an electroplastic elastomer hydrogel material; a conductive elastomer material; or a temperature-sensitive gel material.

Example 3: The wearable device of Example 1 or 2, wherein the body comprises a body of one of the following: a glove; a wristband; a wristwatch; an armband; a headband; or a leg band.

Example 4: The wearable device of any of Examples 1 through 3, wherein the flexible haptic actuator comprises at least one of: a dielectric electroactive polymer material; a ferroelectric polymer material; an electrostrictive graft polymer material; a liquid crystalline polymer material; an ionic electroactive polymer material; an electrorheological fluid material; an ionic polymer-metal composite material; or a hydrogel material.

Example 5: The wearable device of any of Examples 1 through 4, further comprising a backing structure positioned on a side of the tunable stiffness material opposite the flexible haptic actuator, wherein the backing structure has material properties configured to improve the haptic sensation induced by the flexible haptic actuator against the user's skin.

Example 6: The wearable device of Example 5, wherein the backing structure comprises a compressible porous material.

Example 7: The wearable device of any of Examples 1 through 6, wherein the flexible haptic actuator comprises a vibrotactile haptic actuator configured to vibrate upon application of an electrical voltage thereto.

Example 8: The wearable device of Example 7, further comprising a mass coupled to the flexible haptic actuator, wherein the mass is shaped and sized to alter a resonant frequency at which the flexible haptic actuator vibrates.

Example 9: The wearable device of Example 7 or 8, further comprising a frequency controller operatively coupled to the flexible haptic actuator and configured to control a frequency at which the flexible haptic actuator vibrates.

Example 10: The wearable device of any of Examples 7 through 9, further comprising at least one force sensor circuit operatively coupled to the flexible haptic actuator and configured to sense data from the flexible haptic actuator indicative of a force between the flexible haptic actuator and the user's skin.

Example 11: An artificial-reality system, which may include: a head-mounted display configured to display visual content to a user donning the head-mounted display; a wearable device in communication with the head-mounted display, the wearable device comprising: a flexible haptic actuator positioned to transmit a haptic sensation to the user's skin when the wearable device is worn by the user; and a tunable stiffness material adjacent to the flexible haptic actuator, wherein the tunable stiffness material has an adjustable stiffness such that adjustment of the stiffness of the tunable stiffness material alters a haptic sensation induced by the flexible haptic actuator against the user's skin.

Example 12: The artificial-reality system of Example 11, wherein the flexible haptic actuator comprises a vibrotactile haptic actuator.

Example 13: The artificial-reality system of Example 12, wherein the flexible haptic actuator is configured to be used as a force sensor to sense a force between the flexible haptic actuator and the user's skin.

Example 14: The artificial-reality system of Example 13, wherein the wearable device further comprises a frequency controller operatively coupled to the flexible haptic actuator and configured to control a frequency at which the flexible haptic actuator vibrates.

Example 15: The artificial-reality system of Example 14, wherein the frequency controller is configured to control the frequency at which the flexible haptic actuator vibrates at least in part based on the sensed force between the flexible haptic actuator and the user's skin.

Example 16: The artificial-reality system of any of Examples 11 through 15, wherein the flexible haptic actuator is configured to be actuated to coincide with the visual content displayed to the user on the head-mounted display.

Example 17: The artificial-reality system of any of Examples 11 through 16, wherein the wearable device comprises at least one of a glove or a wristband.

Example 18: A method of forming a wearable device, which may include: coupling a tunable stiffness material adjacent to a flexible haptic actuator, wherein the tunable stiffness material has an adjustable stiffness such that adjustment of the stiffness of the tunable stiffness material alters a haptic sensation induced by the flexible haptic actuator; and positioning the tunable stiffness material and the flexible haptic actuator on or in a body of a wearable device shaped and sized to be worn against a user's body part.

Example 19: The method of Example 18, further comprising coupling a backing structure to the tunable stiffness material and flexible haptic actuator, wherein the backing structure comprises a porous material.

Example 20: The method of Example 18 or 19, further comprising electrically coupling a force sensor circuit to the flexible haptic actuator, wherein the force sensor circuit is configured to sense data from the flexible haptic actuator that is indicative of a force between the flexible haptic actuator and the user's body part.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A wearable device, comprising:
 a body shaped and sized to be worn against a user's skin;
 a flexible haptic actuator comprising a vibrotactile haptic actuator configured to vibrate upon actuation, the flexible haptic actuator positioned on or in the body in a location to transmit a haptic sensation to the user's skin when the body is worn by the user; and
 a tunable stiffness material adjacent to the flexible haptic actuator, wherein the tunable stiffness material has an adjustable stiffness such that adjustment of the stiffness of the tunable stiffness material alters a haptic sensation induced by the flexible haptic actuator against the user's skin; and
 a mass coupled to the flexible haptic actuator and separate from the tunable stiffness material, wherein the mass is shaped and sized to alter a resonant frequency at which the flexible haptic actuator vibrates.

2. The wearable device of claim 1, wherein the tunable stiffness material comprises at least one of the following materials:
 a shape memory alloy material;
 an electroplastic elastomer hydrogel material;
 a conductive elastomer material; or
 a temperature-sensitive gel material.

3. The wearable device of claim 1, wherein the body comprises a body of one of the following:
 a glove;
 a wristband;
 a wristwatch;
 an armband;
 a headband; or
 a leg band.

4. The wearable device of claim 1, wherein the flexible haptic actuator comprises at least one of:
 a dielectric electroactive polymer material;
 a ferroelectric polymer material;
 an electrostrictive graft polymer material;
 a liquid crystalline polymer material;
 an ionic electroactive polymer material;
 an electrorheological fluid material;
 an ionic polymer-metal composite material; or
 a hydrogel material.

5. The wearable device of claim 1, further comprising a backing structure positioned on a side of the tunable stiffness material opposite the flexible haptic actuator, wherein the backing structure has material properties configured to improve the haptic sensation induced by the flexible haptic actuator against the user's skin.

6. The wearable device of claim 5, wherein the backing structure comprises a compressible porous material.

7. The wearable device of claim 1, wherein the vibrotactile haptic actuator is configured to vibrate upon application of an electrical voltage thereto.

8. The wearable device of claim 7, further comprising a frequency controller operatively coupled to the flexible haptic actuator and configured to control a frequency at which the flexible haptic actuator vibrates.

9. The wearable device of claim 1, wherein the mass is formed of a flexible material to conform to the user's skin.

10. The wearable device of claim 1, further comprising at least one force sensor circuit operatively coupled to the flexible haptic actuator and configured to sense data from the flexible haptic actuator indicative of a force between the flexible haptic actuator and the user's skin.

11. An artificial-reality system, comprising:
 a head-mounted display configured to display visual content to a user donning the head-mounted display; and
 a wearable device in communication with the head-mounted display, the wearable device comprising:
  a flexible haptic actuator comprising a vibrotactile haptic actuator configured and positioned to transmit a vibrational haptic sensation to the user's skin when the wearable device is worn by the user;
  a tunable stiffness material adjacent to the flexible haptic actuator, wherein the tunable stiffness material has an adjustable stiffness such that adjustment of the stiffness of the tunable stiffness material alters a haptic sensation induced by the flexible haptic actuator against the user's skin; and
  a mass separate from the tunable stiffness material and coupled to the flexible haptic actuator, wherein the mass is shaped and sized to alter a resonant frequency at which the flexible haptic actuator vibrates.

12. The artificial-reality system of claim 11, wherein the flexible haptic actuator is configured to be used as a force sensor to sense a force between the flexible haptic actuator and the user's skin.

13. The artificial-reality system of claim 12, wherein the wearable device further comprises a frequency controller operatively coupled to the flexible haptic actuator and configured to control a frequency at which the flexible haptic actuator vibrates.

14. The artificial-reality system of claim 13, wherein the frequency controller is configured to control the frequency at which the flexible haptic actuator vibrates at least in part based on the sensed force between the flexible haptic actuator and the user's skin.

15. The artificial-reality system of claim 11, wherein the flexible haptic actuator is configured to be actuated to coincide with the visual content displayed to the user on the head-mounted display.

16. The artificial-reality system of claim 11, wherein the wearable device comprises at least one of a glove or a wristband.

17. A method of forming a wearable device, the method comprising:
 coupling a tunable stiffness material adjacent to a flexible vibrotactile haptic actuator, wherein the tunable stiffness material has an adjustable stiffness such that adjustment of the stiffness of the tunable stiffness material alters a haptic sensation induced by the flexible vibrotactile haptic actuator; and
 coupling a mass to the flexible vibrotactile haptic actuator, wherein the mass is separate from the tunable stiffness material and is shaped and sized to alter a resonant frequency at which the flexible vibrotactile haptic actuator vibrates; and
 positioning the tunable stiffness material, the flexible vibrotactile haptic actuator, and the mass on or in a body of a wearable device shaped and sized to be worn against a user's body part.

18. The method of claim 17, further comprising coupling a backing structure to the tunable stiffness material and flexible vibrotactile haptic actuator, wherein the backing structure comprises a porous material.

19. The method of claim 17, further comprising electrically coupling a force sensor circuit to the flexible vibrotactile haptic actuator, wherein the force sensor circuit is configured to sense data from the flexible vibrotactile haptic actuator that is indicative of a force between the flexible vibrotactile haptic actuator and the user's body part.

* * * * *